US012340333B2

(12) United States Patent
Narechania et al.

(10) Patent No.: US 12,340,333 B2
(45) Date of Patent: Jun. 24, 2025

(54) INTERACTIVE TREE REPRESENTING ATTRIBUTE QUALITY OR CONSUMPTION METRICS FOR DATA INGESTION AND OTHER APPLICATIONS

(71) Applicant: ADOBE INC., San Jose, CA (US)

(72) Inventors: Arpit Ajay Narechania, Atlanta, GA (US); Fan Du, Milpitas, CA (US); Atanu R. Sinha, Bangalore (IN); Ryan A. Rossi, San Jose, CA (US); Jane Elizabeth Hoffswell, Seattle, WA (US); Shunan Guo, San Jose, CA (US); Eunyee Koh, Sunnyvale, CA (US); John Anderson, San Jose, CA (US); Sonali Surange, San Rafael, CA (US); Saurabh Mahapatra, Sunnyvale, CA (US); Vasanthi Holtcamp, Fremont, CA (US)

(73) Assignee: Adobe Inc., San Jose, CA (US)

( * ) Notice: Subject to any disclaimer, the term of this patent is extended or adjusted under 35 U.S.C. 154(b) by 193 days.

(21) Appl. No.: 17/693,778

(22) Filed: Mar. 14, 2022

(65) Prior Publication Data

US 2023/0289696 A1    Sep. 14, 2023

(51) Int. Cl.
  *G06F 16/215*   (2019.01)
  *G06Q 10/0639*  (2023.01)
  *G06F 3/0482*   (2013.01)

(52) U.S. Cl.
  CPC ..... *G06Q 10/06393* (2013.01); *G06F 16/215* (2019.01); *G06F 3/0482* (2013.01)

(58) Field of Classification Search
  CPC ............ G06Q 10/06393; G06F 16/215; G06F 3/0482

(Continued)

(56) References Cited

U.S. PATENT DOCUMENTS

2007/0153342 A1\* 7/2007 Sand ........................ H04N 1/46
                                                          358/537
2010/0235725 A1\* 9/2010 Drayton ................ G06F 40/137
                                                          715/810

(Continued)

FOREIGN PATENT DOCUMENTS

WO       2022/251745 A1    12/2022

OTHER PUBLICATIONS

Non-Final Office Action dated Jul. 26, 2023 in U.S. Appl. No. 17/693,799, 54 pages.

(Continued)

*Primary Examiner* — Joshua Bullock
(74) *Attorney, Agent, or Firm* — Shook, Hardy & Bacon L.L.P.

(57) ABSTRACT

Embodiments provide systems, methods, and computer storage media for management, assessment, navigation, and/or discovery of data based on data quality, consumption, and/or utility metrics. Data may be assessed using attribute-level and/or record-level metrics that quantify data: "quality"—the condition of data (e.g., presence of incorrect or incomplete values), its "consumption"—the tracked usage of data in downstream applications (e.g., utilization of attributes in dashboard widgets or customer segmentation rules), and/or its "utility"—a quantifiable impact resulting from the consumption of data (e.g., revenue or number of visits resulting from marketing campaigns that use particular datasets, storage costs of data). This data assessment may be performed at different stages of a data intake, preparation, and/or modeling lifecycle. For example, an interactive tree view may visually represent a nested attribute schema and attribute quality or consumption metrics to facilitate discovery of bad data before ingesting into a data lake.

20 Claims, 23 Drawing Sheets

(58) Field of Classification Search
USPC .......................................................... 707/797
See application file for complete search history.

(56) References Cited

U.S. PATENT DOCUMENTS

| | | | |
|---|---|---|---|
| 2011/0231256 A1 | 9/2011 | Wang et al. | |
| 2012/0265573 A1 | 10/2012 | Van et al. | |
| 2015/0220577 A1 | 8/2015 | Sengupta et al. | |
| 2016/0125456 A1 | 5/2016 | Wu et al. | |
| 2016/0307210 A1 | 10/2016 | Agarwal et al. | |
| 2018/0075092 A1 | 3/2018 | Hernandez et al. | |
| 2018/0322513 A1 | 11/2018 | Smith | |
| 2019/0079957 A1* | 3/2019 | Gao | G06F 16/211 |
| 2019/0079994 A1* | 3/2019 | Ma | G06F 16/2379 |
| 2019/0258983 A1 | 8/2019 | Thomaidou et al. | |
| 2021/0089520 A1 | 3/2021 | Oberhofer et al. | |
| 2021/0090101 A1 | 3/2021 | Marti et al. | |
| 2021/0141838 A1* | 5/2021 | Atallah | G06F 16/2228 |
| 2021/0248144 A1 | 8/2021 | Haile et al. | |
| 2022/0270137 A1 | 8/2022 | Metz et al. | |
| 2023/0057792 A1* | 2/2023 | Krishnamurthy | G06N 20/00 |
| 2023/0089164 A1 | 3/2023 | Ebel et al. | |

OTHER PUBLICATIONS

"Amazon Deequ-Deequ—Unit Tests for Data", Retrieved from Internet URL:https://github.com/awslabs/deequ, accessed on Jun. 3, 2022, pp. 6.

"MetaPlane", Data Observability For Every Data Team, Retrieved from Internet URL : https://www.metaplane.dev/, accessed on Jun. 3, 2022, pp. 8.

Almahmoud, J. et al., "How Teams Communicate about the Quality of ML Models: A Case Study at an International Technology Company", Proceedings of the ACM on Human-Computer Interaction, vol. 5, No. Group, Article 222, pp. 1-24 (Jul. 2021).

Chu, X. et al., "Katara: A Data Cleaning System Powered by Knowledge Bases and Crowd sourcing", Proceedings of the ACM SIGMOD international conference on management of data, pp. 1-15 (2015).

Chu, X. et al., "Holistic Data Cleaning: Putting Violations into Context", IEEE 29th International Conference on Data Engineering (ICDE), pp. 1-12 (2013).

Dumais, S., et al., "Understanding User Behavior Through Log Data and Analysis", Ways of Knowing in HCI, pp. 349-372 (2014).

Farid, M., et al., "CLAMS: Bringing Quality to Data Lakes", ACM SIGMOD, pp. 2089-2092 (2016).

Koesten, L. et al., "Collaborative Practices with Structured Data: Do Tools Support What Users Need?", Proceedings of the 2019 CHI Conference on Human Factors in Computing Systems, pp. 1-14 (May 2019).

Luo, Y. et al., "VisClean: Interactive Cleaning for Progressive Visualization", Proceedings of the VLDB Endowment, vol. 13, No. 12, pp. 2821-2824 (2020).

Liu, Z. et al., "Data-driven Multi-level Segmentation of Image Editing Logs", Proceedings of the 2020 CHI Conference on Human Factors in Computing Systems, pp. 1-12 (Apr. 2020).

Li, L. et al., "DataBook: Turning Big Data into Knowledge with Metadata at Uber", Retrieved from Internet URL : https://eng.uber.com/databook/, accessed on Jun. 3, 2022, pp. 11 (Aug. 3, 2018).

Mayfield, C. et al. "ERACER: A Database Approach for Statistical Inference and Data Cleaning", Proceedings of the 2010 ACM SIGMOD International Conference on Management of data, pp. 75-86 (Jun. 2010).

Narechania, A. et al., "Lumos: Increasing Awareness of Analytic Behavior during Visual Data Analysis", IEEE Transactions on Visualization and Computer Graphics, pp. 1-10 (2021).

Pipino, L. L., et al., "Data Quality Assessment", Communications of the ACM, vol. 45, No. 4, pp. 211-218 (Apr. 2002).

Raman, V. and Hellerstein, J. M. et al., "Potter's Wheel: An Interactive Data Cleaning System", Proceedings of the 27th VLDB Conference, vol. 1, pp. 1-10 (2001).

Sambasivan, N. et al., "Everyone wants to do the model work, not the data work": Data Cascades in High-Stakes AI, Proceedings of the 2021 CHI Conference on Human Factors in Computing Systems, pp. 1-15 (May 2021).

Wall, E. et al., "Left, Right, and Gender: Exploring Interaction Traces to Mitigate Human Biases", IEEE Transactions on Visualization and Computer Graphics, pp. 1-10 (2021).

Wedig, S. and Madani, O. et al., "A Large-Scale Analysis of Query Logs for Assessing Personalization Opportunities", Proceedings of the 12th Acm Sigkdd international conference on Knowledge discovery and data mining, pp. 742-747 (Aug. 20-23, 2006).

Willett, W. et al., "Scented Widgets: Improving Navigation Cues with Embedded Visualizations", IEEE Transactions on Visualization and Computer Graphics, pp. 1-8 (2007).

Yakout, M. et al., "Don't be SCAREd: use SCalable Automatic REpairing with Maximal Likelihood and Bounded Changes", Proceedings of the 2013 ACM SIGMOD International Conference on Management of Data, pp. 553-564 (Jun. 2013).

Zhang, A. X. et al. "How do Data Science Workers Collaborate? Roles, Workflows, and Tools", Proceedings of the ACM on Human-Computer Interaction, vol. 4, Article 22, pp. 1-23 (May 2020).

Akbarnejad, J., Chatzopoulou, G., Eirinaki, M., Koshy, S., Mittal, S., On, D., Polyzotis, N. and Varman, J.S.V., 2010. SQL QueRIE recommendations. Proceedings of the VLDB Endowment, 3(1-2), pp. 1597-1600. (Year: 2010).

Final office action received for U.S. Appl. No. 17/693,799, mailed on Nov. 22, 2023, 72 pages.

Non-Final Office Action received for U.S. Appl. No. 17/693,811, mailed on Jan. 18, 2024, 61 pages.

Akbarnejad et al., "SQL QueRIE Recommendations", Proceedings of the VLDB Endowment, vol. 3, No. (1-2), Sep. 2010, pp. 1597-1600.

Final Office Action received for U.S. Appl. No. 17/693,811, mailed on May 31, 2024, 76 pages.

Non-Final Office Action received for U.S. Appl. No. 17/693,799, mailed on May 3, 2024, 77 pages.

Non-Final Office Action received for U.S. Appl. No. 17/693,811, mailed on Nov. 1, 2024, 84 pages.

* cited by examiner

Luma.csv | XDM ExperienceEvent Schema

Website event records of customers of a fictitious brand, Luma.

Quick Stats

Columns: 97          Rows: 46110          Size: 1.4GB

Preparer: John Doe   Created on: 7-Jun-    Updated on: 28-Jan-
                          2020 11:00:11            2021 20:13:05

Preview

| key | application.name | application.crashes.value | application.launches.val |
|-----|------------------|---------------------------|--------------------------|
| 0   | 0                |                           |                          |
| 1   | 1                |                           |                          |
| 2   | 2                |                           |                          |

INTERACTIVE TREE REPRESENTING ATTRIBUTE QUALITY OR CONSUMPTION METRICS FOR DATA INGESTION AND OTHER APPLICATIONS

Data fuel modern business performance through reporting and analysis, resulting in decision making. Increasingly, data are messy as enterprises ingest even more data into what is commonly referred as a "data lake." Typically, data undergo careful preparation steps (e.g., cleaning, transformations) before analysis. In addition, recent developments of multiple technologies to support a "load-first" paradigm (ingesting all unprocessed data even if of a bad quality), present serious data management challenges. Among them, the assessment of data quality and cleaning large volumes of data with heterogeneous quality have become important tasks in unlocking value from big data.

In order for businesses to discover useful customer segments, data analysts to curate analytics dashboards, data scientists to build machine learning models, and other scenarios, the first step is typically to explore a dataset and look for insights (e.g., interesting patterns, trends, anomalies). However, data analysts, data engineers, data scientists, machine learning researchers, solution architects, and/or others often face problems pertaining to data quality (e.g., is the data complete, correct, unbiased, conforms to the mapped schema, has the correct datatypes?) and usability (e.g., which attributes are most important, where were they used and when?). As such, there is a need for tools to help both novice and experienced users to quickly and efficiently navigate and discover knowledge from large datasets.

SUMMARY

Embodiments of the present invention are directed to techniques for management, assessment, navigation, and/or discovery of data based on data quality, consumption, and/or utility metrics. In some embodiments, data is assessed using attribute-level and/or record-level metrics that quantify data: "quality"—the condition of data (e.g., presence of incorrect or incomplete values), its "consumption"—the tracked usage of data in downstream applications (e.g., utilization of attributes in dashboard widgets or customer segmentation rules), and/or its "utility"— a quantifiable impact resulting from the consumption of data (e.g., revenue or number of visits resulting from marketing campaigns that use particular datasets, storage costs of data). Depending on the implementation, this data assessment is performed at different stages of a data intake, preparation, and/or modeling lifecycle, for example, to facilitate ingestion, selection, and/or monitoring of data.

In an example embodiment, as users interact with datasets in a data lake using one or more applications or tools (e.g., querying data, training a machine learning model using data, using customer data to target a marketing campaign), aspects of these interactions with datasets are collected and stored, and this interaction data is used to generate data consumption metrics that quantify consumption of various records and attributes of a dataset. Additionally or alternatively, various data quality metrics are computed to quantify quality of various records and attributes of a dataset. In some embodiments, one or more data quality and/or consumption metrics are computed for each record, each attribute, and/or each dataset, the metrics are periodically updated, and current and/or historical values are persisted and exposed through an application programming interface for various downstream applications.

In an example data ingestion use case, when ingesting a dataset into a data lake, some sample data from the dataset (e.g., 1% of the dataset, the first 1000 records) is loaded into a landing zone, and data metrics are computed on the sample data in the landing zone or from a stream of the sample data streaming into the landing zone. In some embodiments, the data metrics are presented to the uploader for a determination whether or not to ingest the full dataset into the data lake. In other embodiments, thresholds for data metrics are automatically applied to determine whether or not to ingest the full dataset.

In an example use case involving data selection and/or data monitoring, data metrics are computed on data that has previously been ingested into a data lake, and one or more user interfaces enable a user to navigate the data and view its metrics. In some embodiments, a visual data analysis tool and/or data selection tool presents representations of a dataset and its metrics and enables users to select an appropriate highly effective subset for use in downstream applications, such as preparing a dataset for training a machine learning model, running a digital marketing campaign, or creating an analytics dashboard. In some embodiments, a data monitoring or visualization tool provides a dashboard for monitoring the current status and/or historical values of the data metrics, and/or for creating visualizations based on the data metrics. These are just a few examples, and other use cases are contemplated within the scope of the present disclosure.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 4A-4D illustrate an example dataset health interface and interactive tree representing attribute-level data metrics, in accordance with embodiments of the present invention;

DETAILED DESCRIPTION

Overview

Figure 1:
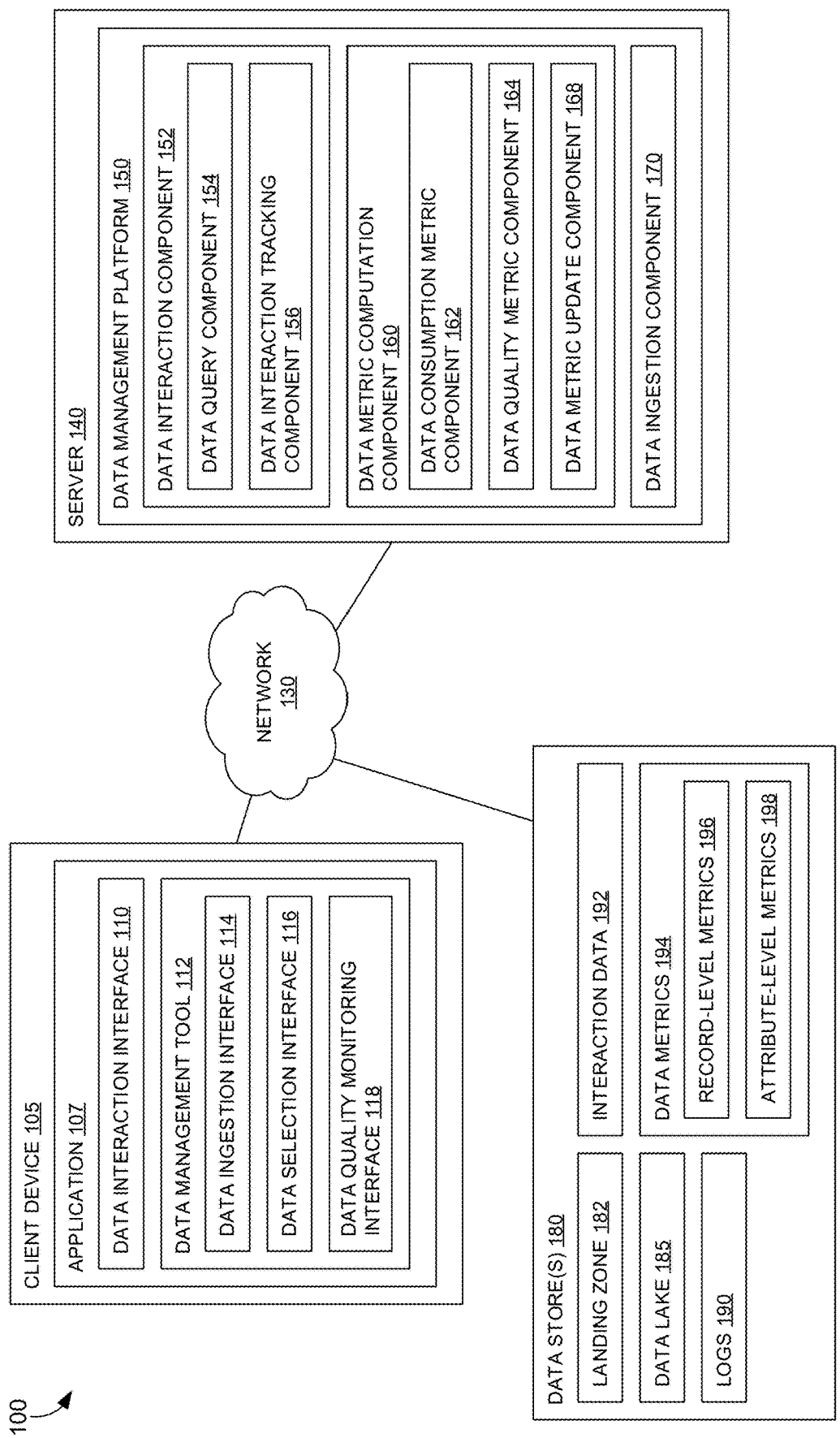
FIG. 1 is a block diagram of an example computing system suitable for data management, in accordance with embodiments of the present invention.

Existing techniques for quantifying the quality of data from large datasets have a variety of drawbacks. Generally, data quality has been assessed across various dimensions such as Completeness, Objectivity, and Correctness. With the advent of data lakes and companies going for a load-first approach for heterogeneous data sources, data discovery and management are a relatively new challenge. One existing technique enables business users to design and enforce complex constraints over large unstructured and semi-structured datasets. Another existing technique provides a knowledge base and crowd-powered data cleaning system that leverages humans to verify the system's suggestions. However, existing techniques for quantifying data quality generally do not consider data consumption, such as how data has previously been used by other users. As such, existing techniques fail to consider a potentially useful metric for quantifying data quality. Furthermore, data quality metrics are typically not available from conventional tools out-of-the-box and require a significant amount of configuration and customization, which are error-prone and often beyond the skill level of certain users.

In terms of data collaboration, prior research has shown that, when collaborating, data science workers tend to perform a variety of roles and work with a variety of stakeholders during different stages of a data science project workflow. Practitioners have been shown to collaborate much less around datasets, relative to collaboration around code. Generally, data collaboration has been considered on a spectrum, from creating and sharing inside and outside an organization to reusing another person's data with limited interaction with the creator. With the proliferation of big data, more and more metadata such as server logs and application logs (e.g., log events) are stored and processed for product and user behavior analytics purposes such as A-B testing of user interface features, generating personalized content, mitigating biases, visual data exploration, recommending and educating alternate design choices, and other scenarios. However, these log data have not been utilized to improve the data stack (e.g., a data processing pipeline into the data lake). For example, conventional tools do not provide a data engineer (or marketer) with insights from other engineers' (or marketers') logged interactions with data.

As such, there is a need for improved data management, assessment, navigation, and discovery tools to help both novice and experienced users to quickly and efficiently navigate and discover knowledge from large datasets.

Accordingly, embodiments of the present invention are directed to management, assessment, navigation, and/or discovery of data based on data quality, consumption, and/or utility metrics. In some embodiments, data is assessed using attribute-level and/or record-level metrics that quantify data: "quality"—the condition of data (e.g., presence of incorrect or incomplete values), its "consumption"—the tracked usage of data in downstream applications (e.g., utilization of attributes in dashboard widgets or customer segmentation rules), and/or its "utility"— a quantifiable impact resulting from the consumption of data (e.g., revenue or number of visits resulting from marketing campaigns that use particular datasets, storage costs of data). Depending on the implementation, this data assessment is performed at different stages of a data intake, preparation, and/or modeling lifecycle, for example, to facilitate ingestion, selection, and/or monitoring of data.

In an example embodiment, as users interact with datasets in a data lake using one or more applications or tools (e.g., querying data, training a machine learning model using data, using customer data to target a marketing campaign), aspects of these interactions with datasets are collected and stored, and this interaction data is used to generate metrics for the data. Example interaction data includes user data (e.g., user role, experience level), usage data (e.g., datasets, records, and/or attributes they worked on, measure(s) of data consumption), metadata (e.g., SQL queries they executed, APIs they called), output artifacts (e.g., visualizations they created and reported in dashboards), measure(s) of data utility (e.g., revenue generated due to output artifacts or marketing campaigns, visits resulting from the marketing campaigns, storage costs of data), and/or others. Example data metrics include data quality, data consumption, and/or data utility metrics.

Taking data quality as an example, in some embodiments, data quality metrics are modeled at an attribute-, record-, and/or schema-level. For example, some embodiments compute one or more attribute-level quality metrics for some or all attributes in a dataset (e.g., cardinality or number of unique/distinct values among an attribute's values, completeness or the percentage of non-null values among an attribute's values, correctness or the percentage of correct values among an attribute's values, objectivity or the extent to which an attribute's values conform to a specified target distribution, an overall combination of the other attribute-level quality metrics). Additionally or alternatively, some embodiments compute one or more record-level quality metrics for some or all records in a dataset (e.g., completeness or the percentage of non-null values in each dataset record, correctness or the percentage of correct values in each dataset record, an overall combination of the other record-level quality metrics). Additionally or alternatively, some embodiments compute one or more schema-level quality metrics for some or all datasets (e.g., completeness or the percentage count of the attributes in an uploaded dataset to the attributes in an assigned schema).

Regarding data consumption metrics, in some embodiments, data consumption metrics are modeled at an attribute-, record-, and/or schema-level. In some cases, data consumption metrics are tailored to a particular data task or manner in which a dataset is consumed (e.g., visual data analysis, training a machine learning model, coming up with segmentation rules for a marketing campaign, some other type of data querying).

Consider an example task in which users utilize a visual data analysis tool to analyze a dataset, select a smaller representative subset, and create visualizations to bookmark insights. In some embodiments, during the analysis task, users interact with various data attributes and records through application of filters (e.g., Gender=Female), (de) selecting attributes and records to be in the dataset or not (e.g., selecting Salary but deselecting Gender), and/or assigning visual encodings (e.g., viewing Age on the X Axis). Some embodiments that collect interaction data based on interactions with a visual data analysis tool such as this compute one or more attribute-level consumption metrics for some or all attributes in a dataset (e.g., filter consumption or the percentage of users who applied a filter by selecting from a multiselect dropdown (e.g., Gender=Female) or dragging range slider handles (e.g., Age=[40-50]) for that attribute; selection consumption or the percentage of users who selected the attribute in their subset for later use, e.g., as a feature selected for training a machine learning model, or as a visual encoding on the X axis of a visualization to be presented in a dashboard; visualization consumption or the percentage of users who assigned the attribute to one or more visual encodings (e.g., X axis) and saved the resultant visualization for display on a dashboard; an overall combination of the other attribute-level consumption metrics). Additionally or alternatively, some embodiments compute one or more record-level consumption metrics for some or all records in a dataset (e.g., selection consumption or the percentage of users who selected the record to be in their subset for later use).

Additionally or alternatively, some embodiments model data consumption metrics from database application logs (e.g., SQL queries executed by different users). For example, consider a tool used by a human resources department that allows users to perform database-level CRUD (create, read, update, delete) operations on employee data (e.g., show employee data, modify their salary, apply leave of absence). In some embodiments, consumption of a particular component of data is determined based on various components of a SQL query, such as attributes (e.g., from SELECT, GROUP BY, WHERE, HAVING clauses), datasets (e.g., from FROM and JOIN clauses), and/or records (e.g., from WHERE and HAVING clauses). Additionally or alternatively, associated metadata (e.g., users who executed the SQL queries along with the corresponding applications and the execution timestamps) are used to determine consumption. In an example implementation, a SQL program is parsed to identify and track attribute- and/or record-level data consumption. As such, some embodiments that determine and track data consumption using database application logs compute one or more attribute-level consumption metrics for some or all attributes in a dataset (e.g., filter consumption or the percentage of users who applied a filter in their query, selection consumption or the percentage of users who selected an attribute in their query, an overall combination of the other attribute-level consumption metrics). Additionally or alternatively, some embodiments compute one or more record-level consumption metrics (e.g., selection consumption or the percentage of users who selected a record in their query).

In some embodiments, data consumption metrics represent a measure of data consumption (e.g., percentage of users who interacted with a particular component of data) as well as other metadata, such as the user who consumed the data (e.g., their role, experience in years), the time of consumption, and/or other metadata. As an illustration, suppose User P (senior data engineer with 5+ years of experience, regular user) and User Q (data engineer with 2 years of experience, rare user) consumed and/or utilized a certain dataset in different ways to run two digital marketing campaigns. A third User R (entry-level engineer with no experience) can benefit from metrics that represent the two prior uses (e.g., the who, how, and when of the respective usages) in deciding what to do next. As such, in some embodiments, data consumption metrics are modeled to give more weight to interactions by more experienced users, more recent interactions, and/or the like. For example, depending on the embodiment, data consumption metrics are computed to account for recency by weighting a contribution from any given interaction by its timestamp. As a result, in some embodiments, any particular data consumption metric represents a combination of how many people used or accessed a component of data (e.g., an attribute or record), how recently it was used or accessed, and/or a role or experience level of the people who used or accessed it.

In some embodiments, data consumption metrics additionally or alternatively represent consumption occurring during a sequence or pattern of interactions. In an example implementation, data consumption for a particular metric may consider interactions occurring in a sequence of interactions, occurring during a session, and/or that match a designated pattern of interactions. Generally, a sequence or pattern of interactions can reveal potential biases in the use of the data (e.g., anchoring or recency bias). As such, some embodiments generate one or more data consumption metrics that assess consumption within a sequence or pattern of interactions (e.g., percentage of users who interacted with a particular component of data during a sequence or pattern, percentage of users who interacted with a particular component of data given a previous interaction with another component of data, etc.).

Some embodiments quantify data utility metrics using one or more measures of data utility and associate those data utility metrics with corresponding data. As an illustration of an example measure of data utility, if a dataset is used in running two digital marketing campaigns but with different segmentation rules and if these two campaigns generate different revenue and churn numbers, then the difference in part can be credited to the choice of attributes and values in the segmentation rules. In this situation, in some embodiments, one or more measures of each campaign (e.g., generated revenue, resulting website visits, ad clicks) are input (or inferred) as measures of data utility and associated with the dataset, attributes, and/or records used in the segmentation rules. In another example, assume an executive decision is based on a dashboard presented to the leadership, then it can be assumed that the attributes utilized in the respective dashboard widgets had an impact (e.g., positive or negative depending on the outcome of the decision). In this situation, in some embodiments, one or more measures of the decision (e.g., resulting gain or loss in revenue resulting from the strategy) are input as measures of data utility of the components of the data used in the dashboard widgets. Since two attributes can be equally consumed but result in completely different marketing campaigns and revenues, feeding back measures of data utility to design and development teams can benefit future product design, be it marketing campaigns, dashboards, or machine learning models. To the best of our knowledge, no existing technique incorporates data utility metrics into a data-modelling workflow.

In many cases, data is added to the data lake over time. As such, some embodiments incrementally update the data metrics (e.g., or a relevant set such as attribute-level metrics and record-level metrics for new records) from time to time. For example and depending on the embodiment, data metrics are computed and/or updated periodically, on-demand, and/or during various stages of a data intake, preparation, and modeling lifecycle. In an example use case, a business dashboard that is reviewed monthly is refreshed with updated data metrics every month (e.g., in batches). In another example use case where a machine learning model is retained on new data as it comes into the data lake, the data metrics are updated in real-time as data comes in to facilitate selection of the best training data at any given time. As such, in some embodiments, data metrics are incrementally updated whenever new data arrives.

In an example data ingestion use case, when ingesting a dataset into a data lake, some sample data from the dataset (e.g., 1% of the dataset, the first 1000 records) is loaded into a landing zone, and data metrics are computed on the sample data in the landing zone or from a stream of the sample data streaming into the landing zone. In some embodiments, the data metrics are presented to the uploader for a determination whether or not to ingest the full dataset into the data lake. In other embodiments, thresholds for data metrics are automatically applied to determine whether or not to ingest the full dataset.

In an example data selection and/or data monitoring use case, data metrics are computed on data that has previously been ingested into a data lake, and one or more user interfaces enable a user to navigate the data and view its metrics. In some embodiments, a visual data analysis tool and/or data selection tool presents representations of a dataset and its metrics and enables users to select an appropriate highly effective subset for use in downstream applications such as preparing a dataset for training a machine learning model, running a digital marketing campaign, or creating an analytics dashboard. In some embodiments, a data monitoring or visualization tool provides a dashboard for monitoring the current status and/or historical values of the data metrics, and/or for creating visualizations based on the data metrics. These are just a few examples, and other use cases are contemplated within the scope of the present disclosure.

Techniques described herein achieve various advantages and benefits over prior techniques. For example, prior techniques generally compute data quality metrics only at an attribute—(column) level, whereas some embodiments of the present techniques additionally or alternatively compute metrics at a record—(row) level. Some digital marketing campaigns rely on customer profile data which involve different attributes such as emailAddress, Location, and others. Data such as these profiles are often stored as records in a database with columns representing the different profile attributes. Computing data quality metrics on these customer profiles (e.g., Row_1 completeness=10%, Row_2 completeness=100%, . . . ) can help marketers categorize information-rich profiles from the rest (and treat them differently, if desired). As such, computing record-level data metrics provides useful information that prior techniques fail to consider.

In terms of data quality metrics, unlike prior techniques, some embodiments compute data quality metrics to represent a measure of data consumption (e.g., percent consumption or some other measure of popularity) in combination with other metadata, such as the user who consumed the data (e.g., their role, experience in years), the time of consumption, and/or other metadata. In terms of the role or experience level of a user who interacts with data, consider a social media platform showing a post's user engagement in terms of views, likes, shares, comments treat all engaging user as equivalent. Grouping the user's relevance and experience (credibility) with respect to the post's content can foster more informed analyses of the overall engagement. In terms of recency of data interactions, in some cases, aggregating certain consumption metrics (e.g., 5 users utilized the 'Location' attribute across 4 dashboards) may not provide enough information because not only data but organizational policies also evolve over time. By weighting more recent data and events more than historical ones, the present techniques provide more useful data consumption metrics. To the best of our knowledge, no prior technique incorporates this temporal aspect into data-modelling workflows in this way.

As such, in various embodiments, any number or type of application is implemented to leverage improved data quality, consumption, and/or utility metrics and empower data scientists, data analysts, data engineers, and/or marketers. Organizations can identify and avoid repeating mistakes and continue employing more rewarding practices. In addition, database administrators and data engineers can use the improved data metrics to improve data quality in a data lake, and identify and mark less effective (e.g., low-quality and low-consumption) datasets for archival or removal to reduce the storage footprint in a data lake or data warehouse environment. Furthermore, by incorporating user and usage data into data metrics, the present techniques provide an improved interface that facilitates the discovery of useful consumption information, and fosters closer cooperation and collaboration within teams (e.g., engineers can take inspiration from other engineers on how they cleaned or transformed a dataset's attributes) as well as across teams (e.g., engineers can take inspiration from marketers on which data are generally utilized in marketing campaigns and channel their focus accordingly). Moreover, various visual representations of the improved metrics improve the efficiency of navigation and discovery of data to facilitate selection of more effective data, which improves various downstream applications. For example, selecting more effective data makes for more efficient training of machine learning models, more effective data visualizations, and/or more effective marketing campaigns. Finally, in some embodiments, persisting data metrics enables a data quality monitoring dashboard to visualize the evolution of an organization's data (and their quality) over time. As such, data quality, consumption, and/or utility metrics provide more useful data insights, enabling a more efficient representation the heath of attributes, records, and datasets, and improvements to any number of use cases, from ingesting, managing, and monitoring data to data selection and data archival.

Example Data Management Environment

Referring now to FIG. 1, a block diagram of example environment 100 suitable for use in implementing embodiments of the invention is shown. Generally, environment 100 is suitable for data management, and, among other things, facilitates management, assessment, navigation, and/or discovery of data based on data quality, consumption, and/or utility metrics. At a high level, environment 100 includes client device 105, server 140, and data store(s) 180.

Depending on the implementation, client device 105 and/or server 140 are any kind of computing device capable of facilitating data management. For example, in an embodiment, client device 105 and/or server 140 are each a computing device such as computing device 1400 of FIG. 14. In some embodiments, client device 105 and/or server 140 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, the components of environment 100 include computer storage media that stores information including data, data structures, computer instructions (e.g., software program instructions, routines, or services), and/or models (e.g., 3D models, machine learning models) used in some embodiments of the technologies described herein. For example, in some implementations, client device 105, server 140, and/or data store(s) 180 comprise corresponding data store(s) (or computer data memory). Further, although client device 105, server 140, and data store(s) 180 are each depicted as a single component in FIG. 1, in some embodiments, client device 105, server 140, and/or data store(s) 180 are implemented using any number of data stores (e.g., using local and/or cloud storage), and/or any data or components described herein are stored on any suitable data store(s) and any suitable device(s).

In the example illustrated in FIG. 1, the components of environment 100 communicate with each other via a network 130. In some non-limiting example implementations, network 130 includes one or more local area networks (LANs) and/or wide area networks (WANs). Such networking environments are commonplace in offices, enterprise-wide computer networks, intranets, and the Internet.

In the example illustrated in FIG. 1, client device 105 includes application 107 with data interaction interface 110 and data management tool 112, and server 140 includes data management platform 150. In some embodiments, data interaction interface 110, data management tool 112, data management platform 150, some portion thereof, and/or any of the elements illustrated in FIG. 1 are incorporated, or integrated, into an application(s), or an add-on(s) or plug-in(s) to an application(s). In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). In some embodiments, data management, assessment, navigation, and/or discovery functionality is incorporated to an application such as Adobe Experience Platform, which enables organizations to centralize and standardize customer data and content from any system and apply data science and machine learning to improve the design and delivery of personalized experiences. Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, data interaction interface 110, data management tool 112, and/or data management platform 150 coordinate via network 130 to execute the functionality described herein. In another example, data interaction interface 110, data management tool 112 and/or data management platform 150 (or some portion thereof) are integrated into a common application executable on a single device. In yet another example, data interaction interface 110, data management tool 112 and/or data management platform 150 (or some portion thereof) are distributed across some other number and/or type(s) of devices. These are just examples, and any suitable allocation of functionality among these or other devices is possible within the scope of the present disclosure.

To begin with a high-level overview of the configuration illustrated in FIG. 1, data store(s) 180 store data lake 185. In some embodiments, data lake 185 stores data, such as uploaded datasets, schemas, classes, and/or the like. In an example embodiment, a provider of data management tool 112 and data management platform 150 has a number of customers, and each customer is allocated its own data lake 185 (e.g., hosted by the provider). In an example workflow through the configuration illustrated in FIG. 1, a user operating client device 105 uses data interaction interface 110 to interact with the data in data lake 185. Depending on the embodiment, data interaction interface 110 queries data, triggers training a machine-learning model using designated training data, and/or triggers a digital marketing campaigns using designated segmentation rules that rely on designated data, to name a few example ways of interacting with data. In some embodiments, a user operating client device 105 additionally or alternatively uses data management tool 112 to interact with the data in data lake 185. In the embodiment illustrated in FIG. 1, data management tool 112 includes data ingestion interface 114 which ingests data into data lake 185, data selection interface 116 which facilities browsing and selection of data from data lake 185, and data quality monitoring interface 118 which provides a dashboard for monitoring the health of data in data lake 185.

Taking data querying as an example interaction, data interaction interface 110 accepts input into client device 105 identifying a query (e.g., a textual input, a specified filter, selection of a graphical element that represent a query) and passes the query to data management platform 150 of server 140, and more specifically, data interaction component 152 of data management platform 150. Data interaction component 152 (e.g., data query component 154 of data interaction component 152) executes the query on data lake 185, and generates and returns a representation of results to application 107 of client device 105 for presentation on a corresponding interface (e.g., data interaction interface 110). Depending on the type of data interaction implemented by a given embodiment, data interaction component 152 and/or data query component 154 implement a corresponding function using designated target data in data lake 185.

Turning now to data management platform 150 of server 140, at a high level, data management platform 150 includes data interaction component 152, data metric computation component 160, and data ingestion component 170. Data interaction component 152 includes data query component 154 which queries data from data lake 185 and returns results, and data interaction tracking component 156 which tracks and stores a representation of interactions with data in data lake 185. Data metric computation component 160 computes and/or updates data metrics 194 about data in data lake 185 (or data to be ingested into data lake 185), for example, based on the tracked interactions with the data in data lake 185. Data ingestion component 170 coordinates with data ingestion interface 114 of application 107 to ingest data into data lake 185 based on data metrics 194 for the data to be ingested.

More specifically, in some embodiments, data interaction tracking component 156 tracks and stores logs 190 and/or other interaction data 192 in data store(s) 180 based on user interactions with data lake 185. Example interaction data 192 collected and/or tracked by data interaction tracking component 156 include user data (e.g., user role, experience level), usage data (e.g., datasets, records, and/or attributes they worked on, measure(s) of data consumption), metadata (e.g., SQL queries they executed, APIs they called), output artifacts (e.g., visualizations they created and reported in dashboards), measure(s) of data utility (e.g., revenue generated due to output artifacts or marketing campaigns, visits resulting from the marketing campaigns, storage costs of data), and/or others.

With respect to user data, in some embodiments, each user has an account profile (e.g., associated with data management tool 112) that stores a representation of the user's role and/or experience level (e.g., input by the user or some representative of the company or organization the user works for). In some embodiments, the user's role and/or experience level are retrieved through an application programming interface (API) to a database of the company or organization the user works for, to a database storing account profiles of some other application, and/or otherwise. As such, in some embodiments where a particular user (or account) interacts with data through data interaction component 152, data interaction tracking component 156 retrieves and associates user data with a representation of his or her interaction.

With respect to usage data and other metadata, in some embodiments, data interaction tracking component 156 identifies and stores a representation of which datasets, records, and/or attributes were interacted with (e.g., consumed), the time of consumption, and/or other metadata about the interaction (e.g., a representation of any executed queries such as SQL queries, APIs that were called, etc.). With respect to (e.g., SQL) queries, in some embodiments, data interaction tracking component 156 identifies the queries and associated metadata from logs 190. As such, in some embodiments where a particular user (or account) interacts with data through data interaction component 152, data interaction tracking component 156 retrieves and associates usage data and/or other metadata with a representation of each data interaction.

With respect to output artifacts and as explained in more detail below, in some embodiments, a user creates visualizations, tables, reports, widgets, or some other representation of data (e.g., using data selection interface 116 and/or data quality monitoring interface 118 of data management tool 112). In some embodiments, data interaction tracking component 156 interprets each of these output artifacts (e.g., saved visualizations or widgets) as a data interaction and stores a representation of the interaction (e.g., including associated user data, usage data, and/or other metadata).

With respect to measures of data utility, in some embodiments, one or more measures of the utility of one or more components of data (e.g., revenue generated due to output artifacts or marketing campaigns, visits resulting from the marketing campaigns, number of campaigns data was used in, storage costs of data) are manually entered through some interface (or inferred), and data interaction tracking component 156 associates the measure(s) of data utility with the corresponding components of data they represent. As such, in some embodiments, data interaction tracking component 156 interprets each marketing campaign, visualization presentation, and/or other occurrence as a data interaction and stores a representation of the interaction and the associated measure(s) of data utility.

Turning now to data metric computation component 160, data metric computation component 160 computes and/or updates data metrics 194 about data in data lake 185 (or data to be ingested into data lake 185) based on an assessment of data quality and/or the representation(s) of the tracked interactions with the data in data lake 185. In the implementation illustrated in FIG. 1, data metric computation component 160 includes data consumption metric component 162 which computes data consumption metrics, data quality metric component 164 which computes data quality metrics, and data metric update component 168, which determines when and triggers a corresponding component of data metric computation component 160 to update a corresponding metric. In some embodiments, a corresponding component of data metric computation component 160 computes data metrics 194 for some or all attributes in a dataset in data lake 185 (e.g., attribute-level metrics 198), for some or all records in a dataset in data lake 185 (e.g., record-level metrics 196), and/or for some or all datasets in data lake 185.

Example Data Quality Metrics. In some embodiments, data quality metric component 164 computes one or more data quality metrics for some or all attributes in a dataset, some or all records in a dataset, and/or for some or all datasets (e.g., a schema-level data metric).

In some embodiments, data quality metric component 164 computes one or more attribute-level quality metrics for some or all attributes in a dataset, such as cardinality, completeness, correctness, objectivity, and/or overall.

In some embodiments, data quality metric component 164 computes a measure of cardinality of an attribute (e.g., [1-n]) such as the number of unique/distinct values among an attribute's values. In some situations, cardinality is used to derive or determine entropy (e.g., the level of information contained in a value when considering all possible values). An example technique for computing attribute cardinality is illustrated by the following pseudo-code:

```
/* Compute number of unique for all N attributes. */
SELECT COUNT(DISTINCT attr₁) AS "attr₁",...,
    COUNT(DISTINCT attr_N) AS "attr_N",
FROM dataset;
/* attr_i means i^th attribute where i ∈ {1...N} */
```

In some embodiments, data quality metric component 164 computes a measure of completeness of an attribute (e.g., [0-100]) such as the percentage of non-null values among an attribute's values. In an example implementation, if 10 out of 50 values for an attribute are null, then its attribute completeness is (50-10)*100/50=80%. Attribute completeness is useful when selecting attributes as features for training machine learning models. An example technique for computing attribute completeness is illustrated by the following pseudo-code:

```
/* Compute % of Non-Null values for all N attributes. */
SELECT CAST(COUNT(attr₁) AS FLOAT) * 100 /
    CAST(COUNT(*) AS FLOAT) AS "attr₁", ...,
    CAST(COUNT(attr_N) AS FLOAT) * 100 /
    CAST(COUNT(*) AS FLOAT) AS "attr_N"
FROM dataset;
/* attr_i means i^th attribute where i ∈ {1...N} */
```

In some embodiments, data quality metric component 164 computes a measure of correctness of an attribute (e.g., [0-100]) such as the percentage of correct values among an attribute's values. In some embodiments, data management tool 112 provides an interface that accepts input selecting, configuring, or otherwise identifying constraints and/or thresholds to determine correctness, for example, using relation (>,<,=), range (BETWEEN), pattern matching (LIKE), and/or membership (IN) SQL operators. In an example implementation, if 5 out of 50 values for an attribute are incorrect, then its correctness is (50-5)*100/50=90%. An example technique for computing attribute correctness is illustrated by the following pseudo-code:

```
/* Compute % of correct values for all N attributes. */
SELECT
    CAST(100 * CAST(SUM(CASE WHEN Age BETWEEN 0 AND 150
        THEN 1 ELSE 0 END) AS FLOAT) / COUNT(Age) AS FLOAT),
    CAST(100 * CAST(SUM(CASE WHEN Email LIKE '%_@_%_ _%'
        THEN 1 ELSE 0 END) AS FLOAT) / COUNT(Email) AS FLOAT),
    CAST(100 * CAST(SUM(CASE WHEN Country IN('CA' , 'US')
        THEN 1 ELSE 0 END) AS FLOAT) / COUNT(Country) AS
        FLOAT),
    ...,
    CAST(100 * CAST(SUM(CASE WHEN attr$_N$ satisfies a condition
        THEN 1 ELSE 0 END) AS FLOAT) / COUNT(attr$_N$) AS FLOAT)
FROM dataset;
/* attr$_i$ means i$^{th}$ attribute where i ∈ {1...N} */
```

In some embodiments, data quality metric component 164 computes a measure of objectivity of an attribute (e.g., [0-100]) such as the extent to which an attribute's values conform to a specified target distribution. In some embodiments, data management tool 112 provides an interface that accepts input selecting, configuring, or otherwise identifying constraints and/or thresholds to determine objectivity, for example, using relation (>,<,=), range (BETWEEN), pattern matching (LIKE), and/or membership (IN) SQL operators. In an example implementation, if a Gender attribute has 90% males and 10% females, then it is evidently skewed towards males and can be considered not objective with respect to gender equality considerations. In another example implementation, if majority sales are supposed to be from the USA but a particular dataset has represents sales with a Country attribute that does not reflect a majority of the sales from the USA, the attribute can be considered not objective. An example technique for computing attribute objectivity is illustrated by the following pseudo-code:

```
/* Determine if values across all N attributes are
Objective or not; 1 = Yes, 0 = No */
SELECT CAST(100 * (CASE WHEN
    (SELECT 100 * CAST(COUNT(Gender) AS float) /
        (SELECT CASE(COUNT(Gender) AS float) FROM dataset)
    FROM dataset
    WHERE Gender = 'Male' ) != 50 /* 50=business threshold */
    THEN 1 ELSE 0 END) AS FLOAT) AS "IS_Gender_Objective",
    ...,
/* compare other attr$_i$ distributions with a target/baseline */
FROM dataset;
/* attr$_i$ means i$^{th}$ attribute where i ε {1...N} */
```

In some embodiments, data quality metric component 164 computes a measure of the overall combination of the other attribute-level quality metrics for an attribute (e.g., [0-100]). In an example implementation that combines attribute cardinality, completeness, correctness, objectivity, and/or others, data quality metric component 164 combines the measures of each of the other attribute-level quality metrics (e.g., by normalizing, averaging, taking the maximum). In some embodiments, data quality metric component 164 assigns different weights for different attribute-level quality metrics. For example, some users might prefer an overall metric that weights completeness by 75%, correctness by 25%, and does not consider objectivity. In some embodiments, data management tool 112 provides an interface that accepts input selecting, configuring, or otherwise identifying the attribute-level quality metrics and/or corresponding weights used to generate an overall attribute-level quality metric for an attribute.

Turning now to record-level quality metrics, in some embodiments, data quality metric component 164 computes one or more record-level quality metrics for some or all records in a dataset, such as completeness, correctness, and/or overall.

In some embodiments, data quality metric component 164 computes a measure of completeness of a record (e.g., [0-100]) such as the percentage of non-null values in each dataset record. In some implementations, if a record has 50 values (each corresponding to an attribute), 25 of which are null, then its record completeness is (50-25)*100/50=50%. In some situations, record completeness is helpful in designing marketing campaigns where efficacy is gauged based on the quality of customer profiles (e.g., represented as records). An example technique for computing record completeness for all dataset records is illustrated by the following pseudo-code:

```
/* Compute % of Non-Null values for all dataset records. */
SELECT PrimaryKey, (CAST(
    (CASE WHEN attr$_1$ IS NULL THEN 0 ELSE 1 END) + ... +
    (CASE WHEN attr$_N$ IS NULL THEN 0 ELSE 1 END) AS
    FLOAT) * 100 / N) AS "row_completeness"
FROM dataset;
    /* attr$_i$ means i$^{th}$ attribute where i ε {1...N} */
```

In some embodiments, data quality metric component 164 computes a measure of correctness of a record (e.g., [0-100]) such as the percentage of non-null values in each dataset record. In some embodiments, data management tool 112 provides an interface that accepts input selecting, configuring, or otherwise identifying constraints and/or thresholds to determine correctness, In an example implementation, if a record has 50 values (each value corresponding to an attribute), 15 of which are incorrect (based on constraints set by the organization), then its record correctness is (50-15)*100/50=70%. An example technique for computing record correctness for all dataset records is illustrated by the following pseudo-code:

```
/* Compute % of correct values for all dataset records. */
SELECT CAST(
    (CAST(100 * CAST(SUM(CASE WHEN Age BETWEEN 0 AND 150
        THEN 1 ELSE 0 END) AS FLOAT) / COUNT(Age) AS FLOAT) +
    CAST(100 * CAST(SUM(CASE WHEN Email LIKE '%_@_%_ _%'
        THEN 1 ELSE 0 END) AS FLOAT) / COUNT(Email) AS FLOAT) +
    CAST(100 * CAST(SUM(CASE WHEN County IN('CA', 'US')
        THEN 1 ELSE 0 END) AS FLOAT) / COUNT(Country) AS FLOAT)
    + ... +
    ) / N AS FLOAT) AS "row_correctness"
FROM dataset;
    /* attr$_i$ means i$^{th}$ attribute where i ε {1...N} */
```

In some embodiments, data quality metric component 164 computes a measure of the overall combination of the other record-level quality metrics for an attribute (e.g., [0-100]). In an example implementation that combines record completeness, correctness, and/or others, data quality metric component 164 combines the measures of each of the other record-level quality metrics (e.g., by normalizing and/or averaging). In some embodiments, data quality metric component 164 assigns different weights for different record-level quality metrics. In some embodiments, data management tool 112 provides an interface that accepts input selecting, configuring, or otherwise identifying the record-level quality metrics and/or corresponding weights used to generate an overall record-level quality metric for an record.

Turning now to dataset or schema-level quality metrics, in some embodiments, data quality metric component 164 computes one or more schema-level quality metrics for some or all datasets. In some embodiments, data quality metric component 164 computes a measure of completeness of a dataset (e.g., [0-100]) such as the percentage count of the attributes in an uploaded dataset to the attributes in a designated schema. In an example implementation, if a dataset has 6 attributes and a designated schema has 12, then the schema completeness would be 6*100/12=50%. This metric can help understand how appropriate and effective a schema is for a dataset. An example technique for computing schema completeness is illustrated by the following pseudocode:

```
# Compute % count of dataset attributes to those in schema.
schema_completeness = len(attributes_in_dataset) * 100 / len
        ↪ (attributes_in_parent_schema)
```

Example Data Consumption Metrics. In some embodiments, data consumption metric component 162 computes one or more data consumption metrics for some or all attributes in a dataset, some or all records in a dataset, and/or for some or all datasets (e.g., a schema-level data metric). In some cases, data consumption metrics are tailored to a particular data task or manner in which a dataset is consumed (e.g., visual data analysis, training a machine learning model, coming up with segmentation rules for a marketing campaign, some other type of data querying).

Consider an example task in which users utilize a visual data analysis tool (e.g., data selection interface 116 and/or data quality monitoring interface 118) to analyze a dataset, select a smaller representative subset, and create visualizations to bookmark insights. In some embodiments, during the analysis task, users use the visual data analysis tool to interact with various data attributes and records through application of filters (e.g., Gender=Female), (de)selecting attributes and records to be in the dataset or not (e.g., selecting Salary but deselecting Gender), and/or assigning visual encodings (e.g., viewing Age on the X Axis). Some embodiments that collect interaction data based on interactions with a visual data analysis tool such as this compute one or more attribute-level consumption metrics for some or all attributes in a dataset, such as filter consumption, selection consumption, visualization consumption, and/or overall consumption. In some embodiments, data consumption metric component 162 weights any or all attribute-level consumption metrics by user role, user experience, and/or recency.

In some embodiments, data consumption metric component 162 computes a measure of filter consumption for an attribute (e.g., [1-100]) such as the percentage of users who applied a filter on an attribute by selecting an attribute value from a multiselect dropdown (e.g., Gender=Female) or dragging range slider handles (e.g., Age=[40-50]) for that attribute (e.g., using data selection interface 116 and/or data quality monitoring interface 118). Filter consumption metrics can help a digital marketer to set segmentation rules (e.g., which in some situations represent different filters) on customer profiles for running a campaign based on how previous users applied them.

In some embodiments, data consumption metric component 162 computes a measure of selection consumption for an attribute (e.g., [1-100]) such as the percentage of users who selected the attribute in their subset for later use, for example, (using data interaction interface 110 to select the attribute) as a feature selected for training a machine learning model, or (using data selection interface 116 to assign the attribute) as a visual encoding on an axis of a visualization to be presented in a dashboard. Selection consumption metrics for an attribute can help future users to take extra caution regarding the quality of attributes that are frequently selected, e.g., for use in model training.

In some embodiments, data consumption metric component 162 computes a measure of visualization consumption for an attribute (e.g., [1-100]) such as the percentage of users who assigned the attribute to one or more visual encodings (e.g., X axis) and/or saved the resulting visualization for display on a dashboard (e.g., using data selection interface 116 or data quality monitoring interface 118). Visualization consumption metrics can help future users to identify highly consumed attributes and handle such attributes with care, to the extent potential business and policy decisions are taken based on the insights from these attributes.

In some embodiments, data consumption metric component 162 computes a measure of the overall combination of the other attribute-level consumption metrics for an attribute (e.g., [0-100]). In an example implementation that combines attribute-level consumption metrics, data consumption metric component 162 combines the measures of each of the other attribute-level consumption metrics (e.g., by normalizing, averaging, taking the maximum). Some embodiments combine filter, selection, and/or visualization consumption metrics for an attribute by taking the maximum because attributes are generally not utilized across all three consumption modes simultaneously, so usage across any one mode is considered a representative signal. In some embodiments, data consumption metric component 162 assigns different weights for different attribute-level consumption metrics. For example, some users might prefer an overall metric that weights selection consumption by 75%, visualization consumption by 25%, and does not consider filter consumption. In some embodiments, data management tool 112 provides an interface that accepts input selecting, configuring, or otherwise identifying the attribute-level consumption metrics and/or corresponding weights used to generate an overall attribute-level consumption metric for an attribute.

Turning now to record-level consumption metrics, in some embodiments, data consumption metric component 162 computes one or more record-level consumption metrics for some or all records in a dataset, such as selection consumption. For example, in some embodiments, data consumption metric component 162 computes a measure of selection consumption of a record (e.g., [0-100]) such as the percentage of users who selected the record to be in their subset (e.g., as a result of some type of attribute filters) for later use.

In some embodiments, data consumption metric component 162 computes data consumption metrics using database application logs (e.g., logs 190), such as SQL queries executed by different users. For example, consider a tool (e.g., data interaction interface 110) used by a human resources department that allows users to perform database-level CRUD (create, read, update, delete) operations on employee data (e.g., show employee data, modify their salary, apply leave of absence). In some embodiments, consumption of a particular component of data is determined based on various components of a SQL query, such as attributes (e.g., from SELECT, GROUP BY, WHERE, HAVING clauses), datasets (e.g., from FROM and JOIN clauses), and/or records (e.g., from WHERE and HAVING clauses). Additionally or alternatively, associated metadata (e.g., users who executed the SQL queries along with the corresponding applications and the execution timestamps) are used to determine consumption. In an example implementation, data interaction tracking component 156 and/or data consumption metric component 162 use an example technique represented by the following pseudo-code to parse a SQL program to identify and track attribute- and/or record-level data consumption.

```
for sql in database log:
    parsed_sql = SQLParser(sql) # parse the SQL
    attributes = # from SELECT, WHERE, GROUP BY, HAVING,
    subqueries
    datasets = # from FROM (also in subqueries)
    records = # by actually executing the WHERE and maybe HAVING
      ↪ clause condition(s) and utilizing the result set.
    user = # the user who executed the query
    timestamp = # the time when the query was executed
    # groupby the above metrics and generate aggregate counts to
      ↪ know the popular attributes, datasets, users,
      ↪ applications, etc.
```

As such, in some embodiments that determine and track data consumption using logs 190, data consumption metric component 162 computes one or more attribute-level consumption metrics for some or all attributes in a dataset (e.g., a measure of filter consumption such as the percentage of users who applied a filter in their query, a measure of selection consumption such as the percentage of users who selected an attribute in their query, a measure of an overall combination of the other attribute-level consumption metrics). Additionally or alternatively, in some embodiments, data consumption metric component 162 computes one or more record-level consumption metrics (e.g., a measure of selection consumption such as the percentage of users who selected a record in their query).

The foregoing description described some possible data metrics 194 computed by some implementations of data metric computation component 160. These data metrics are meant simply as examples, and some embodiments additionally or alternative compute other data metrics.

In some embodiments, data metric update component 168 periodically triggers incremental updates to data metrics 194, for example, to reflect new data that entered data lake 185 since the last time data metrics 194 were computed. In some embodiments, data metric update component 168 identifies and triggers updates to a relevant subset of data metrics, such as attribute-level metrics and record-level metrics for new records. In some implementations, data metric update component 168 triggers updates periodically, on-demand, and/or during various stages of a data intake, preparation, and modeling lifecycle. For example, in some embodiments in which data quality monitoring interface 118 is reviewed monthly, data quality monitoring interface 118 and/or data metric update component 168 trigger updates to data metrics 194 every month. In another example where a machine learning model is retained on new data as it enters data lake 185, data metric update component 168 triggers updates whenever new data arrives in data lake 185. In other examples, and as described in more detail below, data metric update component 168 coordinates with data ingestion interface 114 to compute data metrics 194 for sample data proposed for ingestion into data lake 185, coordinates with data selection interface 116 to compute data metrics 194 for data already ingested in data lake 185 to facilitate data selection, and/or coordinates with data quality monitoring interface 118 to update and/or monitor current and/or historical data metrics 194.

Returning now to data management tool 112 on client device 105, in the implementation illustrated in FIG. 1, data management tool 112 includes data ingestion interface 114, data selection interface 116, and data quality monitoring interface 118.

In some embodiments, data ingestion interface 114 accepts input identifying a dataset for ingestion and facilitates ingestion. In an example embodiment, data ingestion interface 114 accepts input identifying a location where the dataset to be ingested in stored and coordinates with data ingestion component 170 to load (e.g., upload) sample data from the dataset into landing zone 182 of data store(s) 180. Depending on the implementation, example amounts of sample data include some fraction of the dataset, such as 1%, the first 1000 records, and/or other amounts. In some embodiments, data ingestion component 170 triggers data metric computation component 160 to compute data metrics for the sample data (e.g., off the stream of data into landing zone 182, from the sample data once it is stored in landing zone 182). In some embodiments, data ingestion interface 114 provides the computed data metrics for presentation on data ingestion interface 114 and/or prompts the user to decide whether or not to ingest the full dataset into data lake 185 based on the data metrics for the sample data. In some embodiments, data ingestion component 170 makes the determination itself by applying designated thresholds for designated data metrics. In some embodiments, if a determination is made to ingest the full dataset, data ingestion interface 114 and data ingestion component 170 coordinate to ingest the dataset into data lake 185 (e.g., releasing or moving the sample data from landing zone 182 into data lake 185, uploading remaining data from the dataset).

Additionally or alternatively, in some embodiments, data selection interface 116 accepts input navigating and selecting a subset of data (e.g., for generating visualizations). In an example embodiment, data selection interface 116 accepts input identifying data (e.g., a dataset) in data lake 185, accesses and/or triggers data metric computation component 160 to compute or update data metrics for the data, and retrieves and presents the data metrics to facilitate selection of a subset of the data, for example, for use in downstream applications such as preparing a dataset for training a machine learning model, running a digital marketing campaign, and/or creating an analytics dashboard and/or data visualizations. In some embodiments, data quality monitoring interface 118 additionally or alternatively retrieves and presents the current status and/or historical values of the data metrics.

Figure 2:
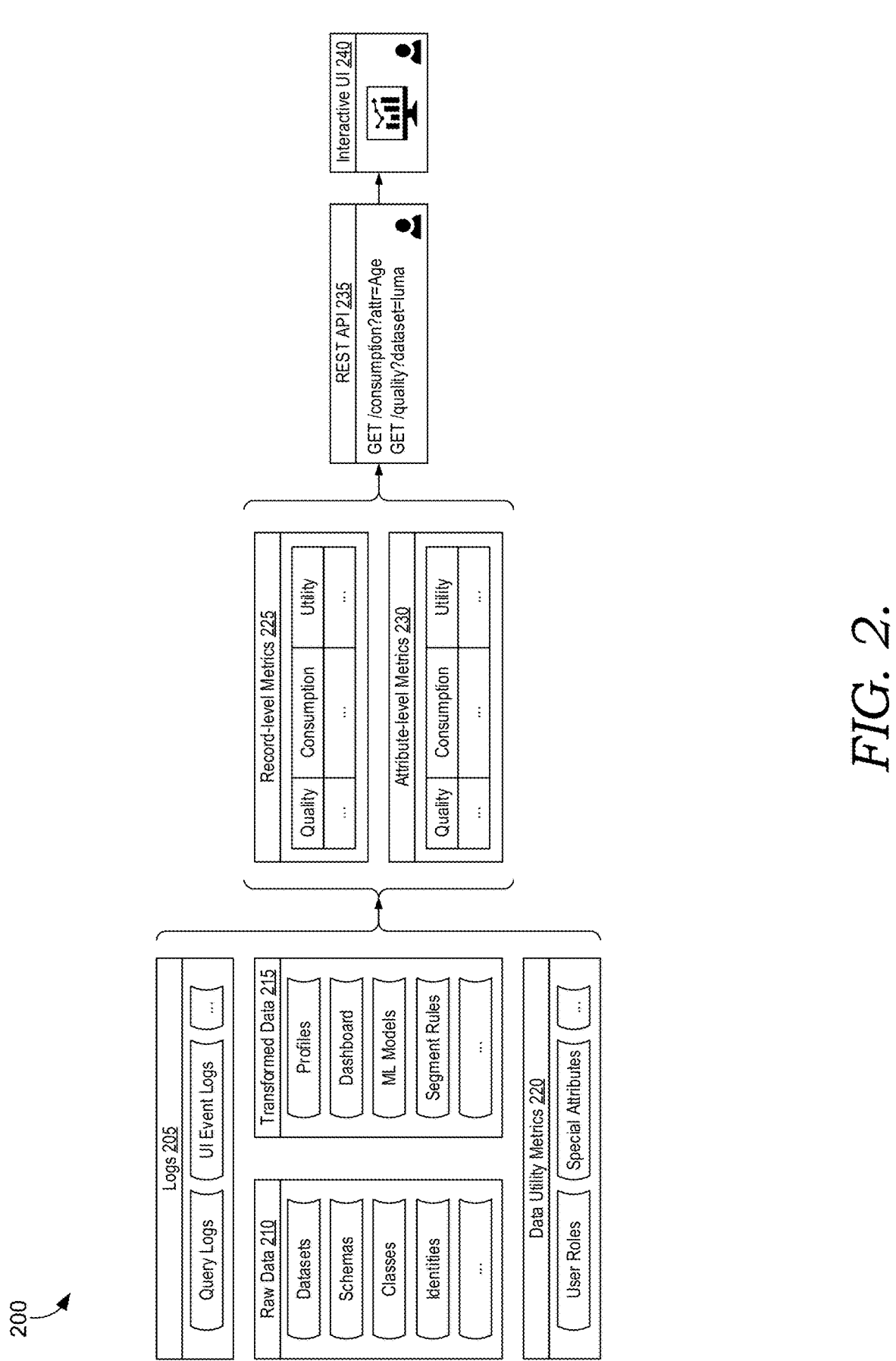
FIG. 2 is a data flow diagram illustrating an example data ingestion and monitoring pipeline, in accordance with embodiments of the present invention.

Turning now to FIG. 2, FIG. 2 is a data flow diagram illustrating an example data ingestion and monitoring pipeline 200, in accordance with embodiments of the present invention. At a high level, data ingestion and monitoring pipeline 200 ingests data from heterogeneous data sources (e.g., raw data 210, transformed data 215, log data (e.g., logs 205), and/or data utility metrics 220) and uses some or all of this data to compute and store record-level metrics 225 and/or attribute-level metrics 230. In an example implementation, raw data 210 is data that is fed into the lake, such as uploaded datasets, schemas, classes, etc., and data ingestion and monitoring pipeline 200 ingests raw data 210 (e.g., into data lake 185 or landing zone 182 of FIG. 1). Through interactions with the data, in some cases, raw data 210 is used to create or identify specialized datasets (e.g., transformed data 215), such as profile datasets, dashboard configurations, customer segmentation rules, and/or other types. In some embodiments, various logs 205 are generated, for example, when ingesting or querying. Example logs represent, a temporal record of user events in the system, such as query logs (e.g., users querying the databases), user interface event logs (users interacting with a user interface), and/or other types. In some embodiments, data utility metrics 220 (e.g., revenue generated due to output artifacts or marketing campaigns, visits resulting from marketing campaigns, storage costs of data) are entered or retrieved via some interface.

In some embodiments, data ingestion and monitoring pipeline 200 computes record-level metrics 225 and/or attribute-level metrics 230 based on these data (e.g., as described above with respect to data metric computation component 160 of FIG. 1), and/or persists them in a data store (e.g., data store(s) 180 of FIG. 1) with a new timestamp. In some embodiments, an API (e.g., a representational state transfer or REST API, such as REST API 235) provides access this data store to read record-level metrics 225 and/or attribute-level metrics 230, and a representation of record-level metrics 225 and/or attribute-level metrics 230 is visualized in a user interface (e.g., an interactive UI 240, data management tool 112 of FIG. 1).

Figure 3:
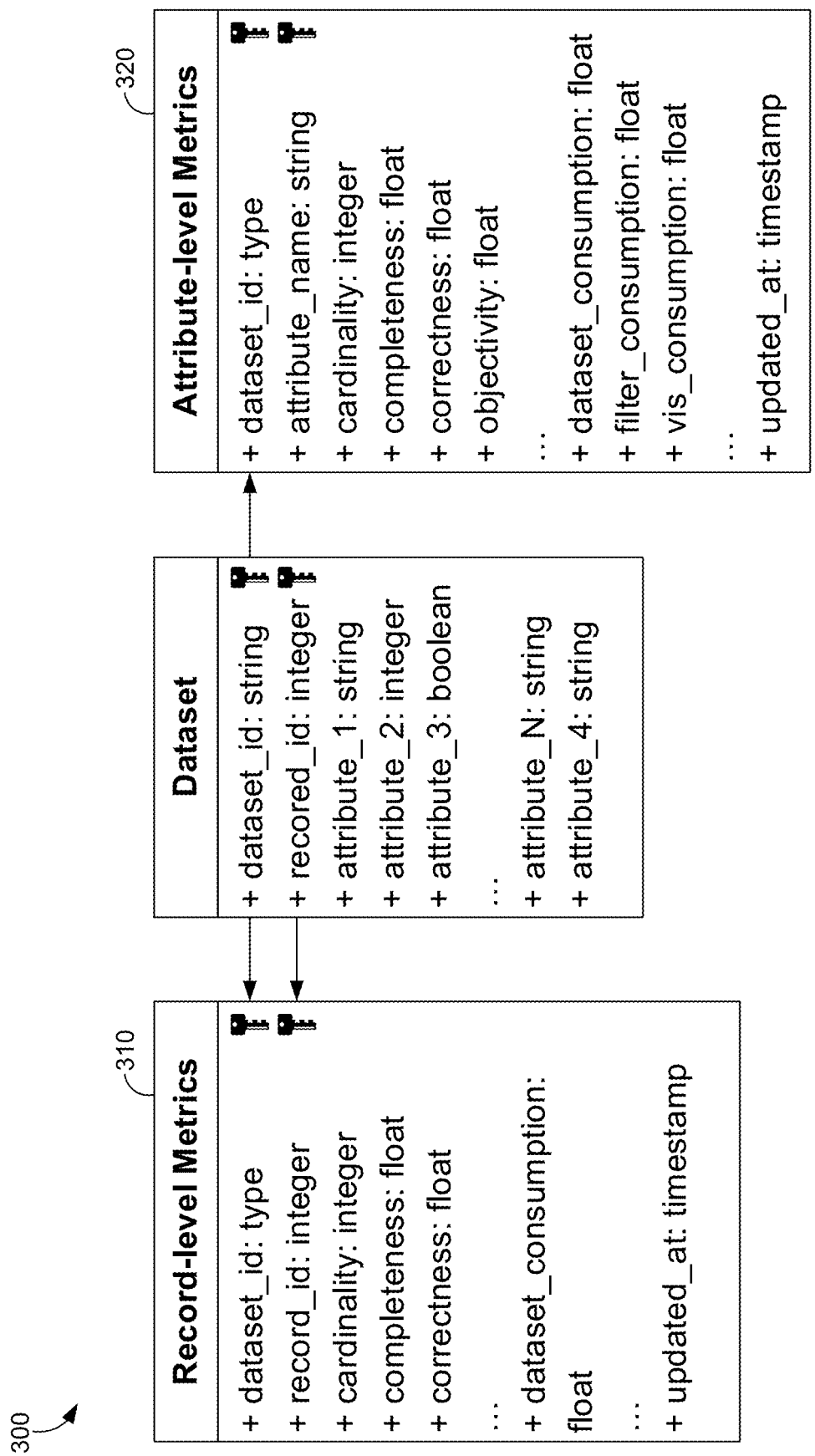
FIG. 3 illustrates an example database schema for persisting data metrics, in accordance with embodiments of the present invention.

FIG. 3 illustrates an example database schema 300 for persisting data metrics, in accordance with embodiments of the present invention. More specifically, database schema 300 is an example database schema for persisting record-level metrics 310 and/or attribute-level metrics 320. In some embodiments, database schema 300 is used to persist current and/or historical metrics of datasets (e.g., within data lake 185 of FIG. 1), enabling users to monitor the temporal evolution of the data (e.g., within their organization). In an example embodiment, dataset ID and record ID are used as primary keys for record-level metrics 310, and/or dataset ID and attribute ID are used as primary keys for attribute-level metrics 320 (illustrated by keys in FIG. 3). In some cases, persisting record-level quality and consumption metrics can have a large storage footprint. To address this, some implementations compute stratified bins (e.g., aggregating record-level metrics 310 at a higher-level and then persisting only these). For example, instead of persisting "completeness" for each record, some embodiments compute and persist bins aggregating metrics for multiple records (e.g., "40% records are high quality, 50% are medium quality, and remaining 10% are low quality"), for example, based on designated thresholds for high, medium, and low qualities.

FIGS. 4A-4D illustrate an example dataset health interface and interactive tree representing attribute-level data metrics, in accordance with embodiments of the present invention. In an example embodiment, the user interfaces illustrated in FIGS. 4A-4D are incorporated into a data ingestion tool (e.g., data ingestion interface 114 of FIG. 1). Starting with FIG. 4A, dataset health interface 400 shows a summary (e.g., dataset summary view 401) of a particular dataset (e.g., a selected dataset, a sample dataset ingested into a landing zone), along with various quality, consumption, and/or data utility metrics for the overall dataset (e.g., dataset-level metrics view 404), and interactive tree viewer 415 that accepts input interactively navigating a nested attribute schema and that visualizes data quality, consumption, and/or data utility metrics for each attribute. In an example implementation, dataset health interface 400 serves to inform users of "bad or less effective data" during data ingestion to facilitate appropriate action before it enters the data lake.

FIG. 4B illustrates an example dataset summary view 401. In this example, dataset summary view 401 represents information about the particular dataset (e.g., being ingested, previously ingested), such as the dataset's description, number of columns and rows, size on disk, creator, timestamps of creation and updates, and/or a few sample records as a preview of the dataset.

Figure 4A:
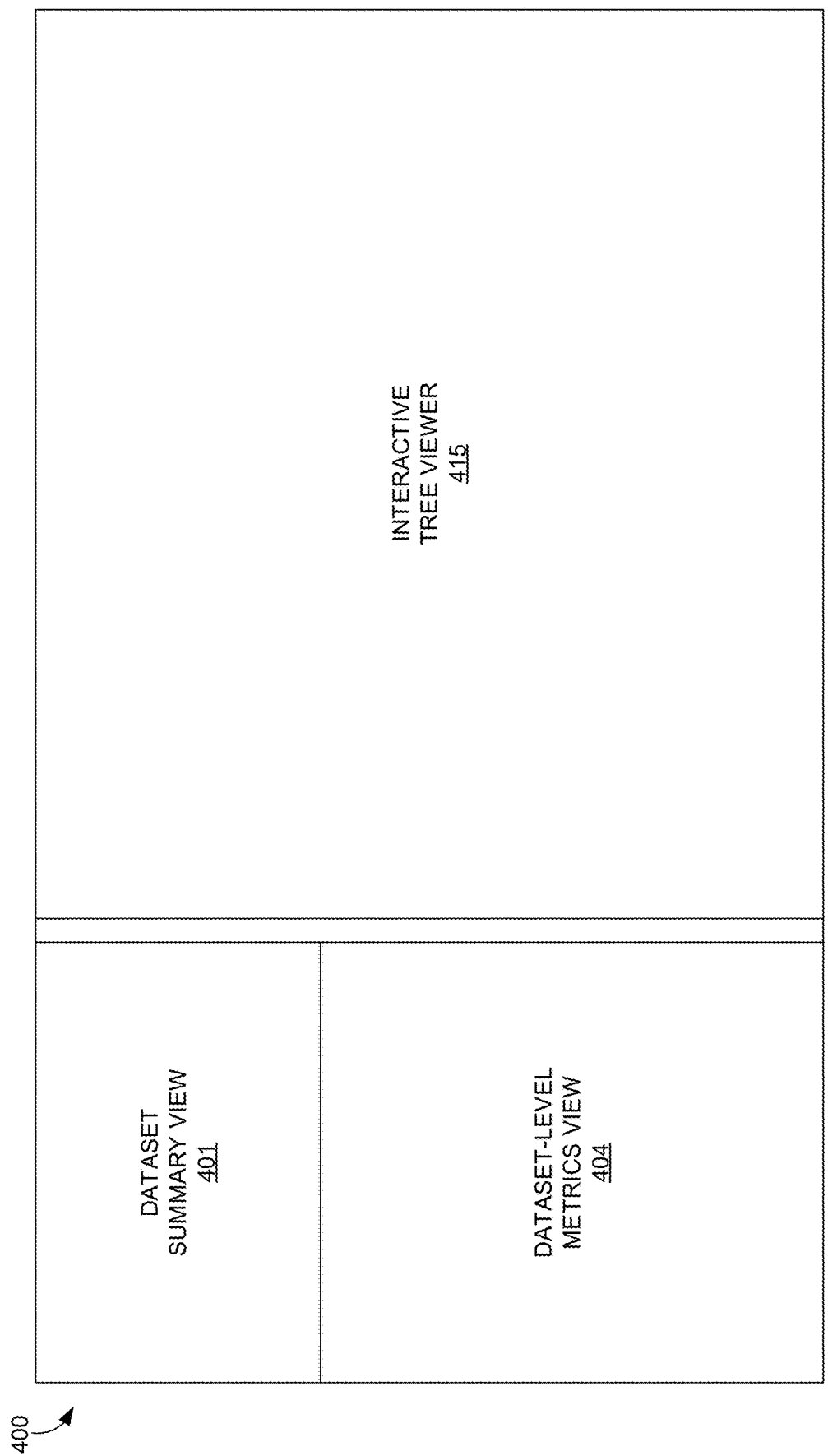
Figure 4C:
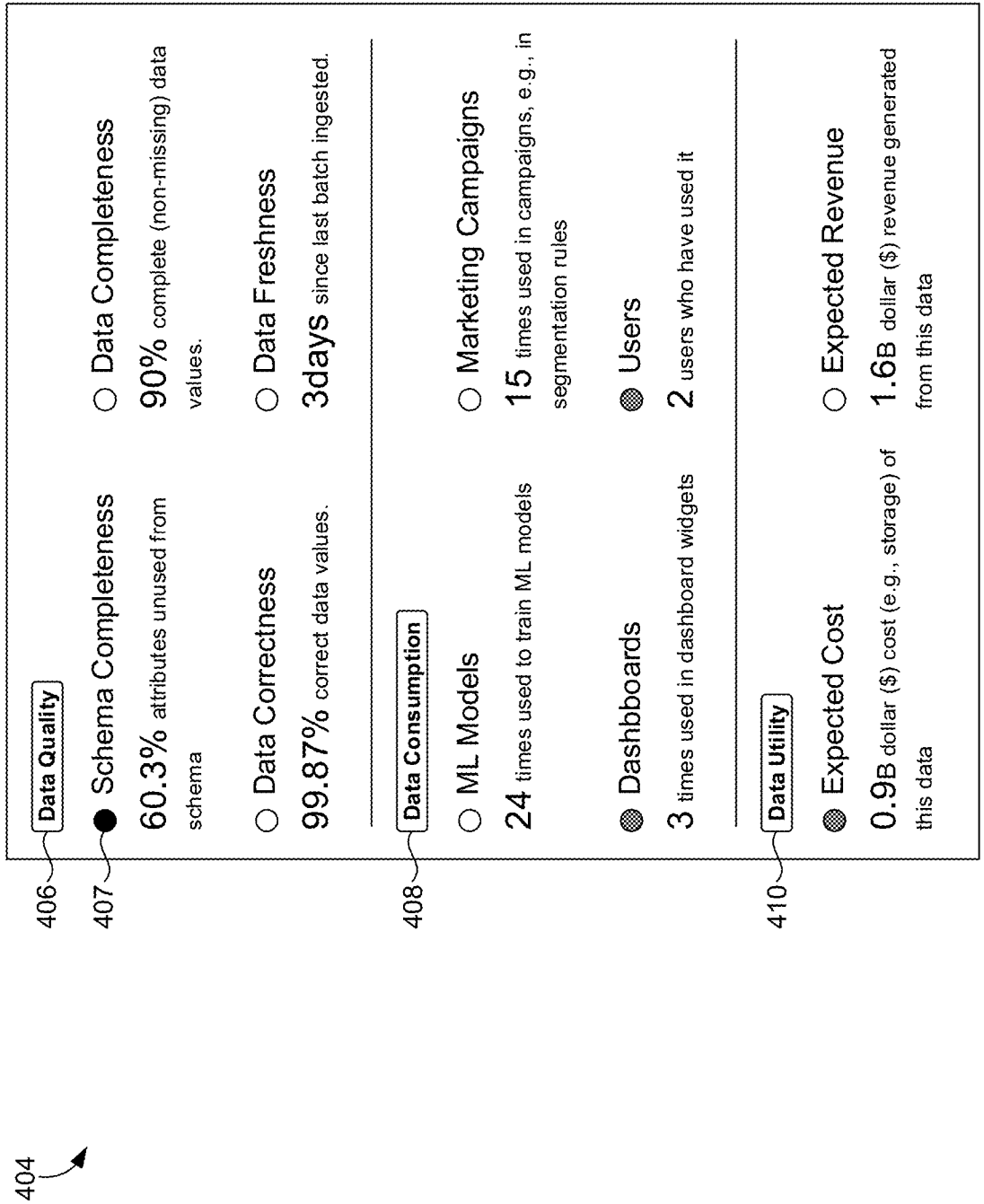

FIG. 4C illustrates an example dataset-level metrics view 404. In this example, dataset-level metrics view 404 shows various dataset-level metrics (e.g., data quality 406, data consumption 408, data utility 410) for the dataset as a whole. In an example implementation, each metric includes a visual representation of the metric, such as a numeric or graphical representation of that metric's value. In some embodiments, a glyph (e.g., glyph 407) visually represents a corresponding metric's value, for example, using different (e.g., configurable) colors, gradients, and/or patterns corresponding to different (e.g., configurable) health ranges (e.g., low, medium, high). For example, the dataset in this example is 90% complete, has been used in 3 dashboards by 2 users, and has led to a $1.6B revenue.

Figure 4D:
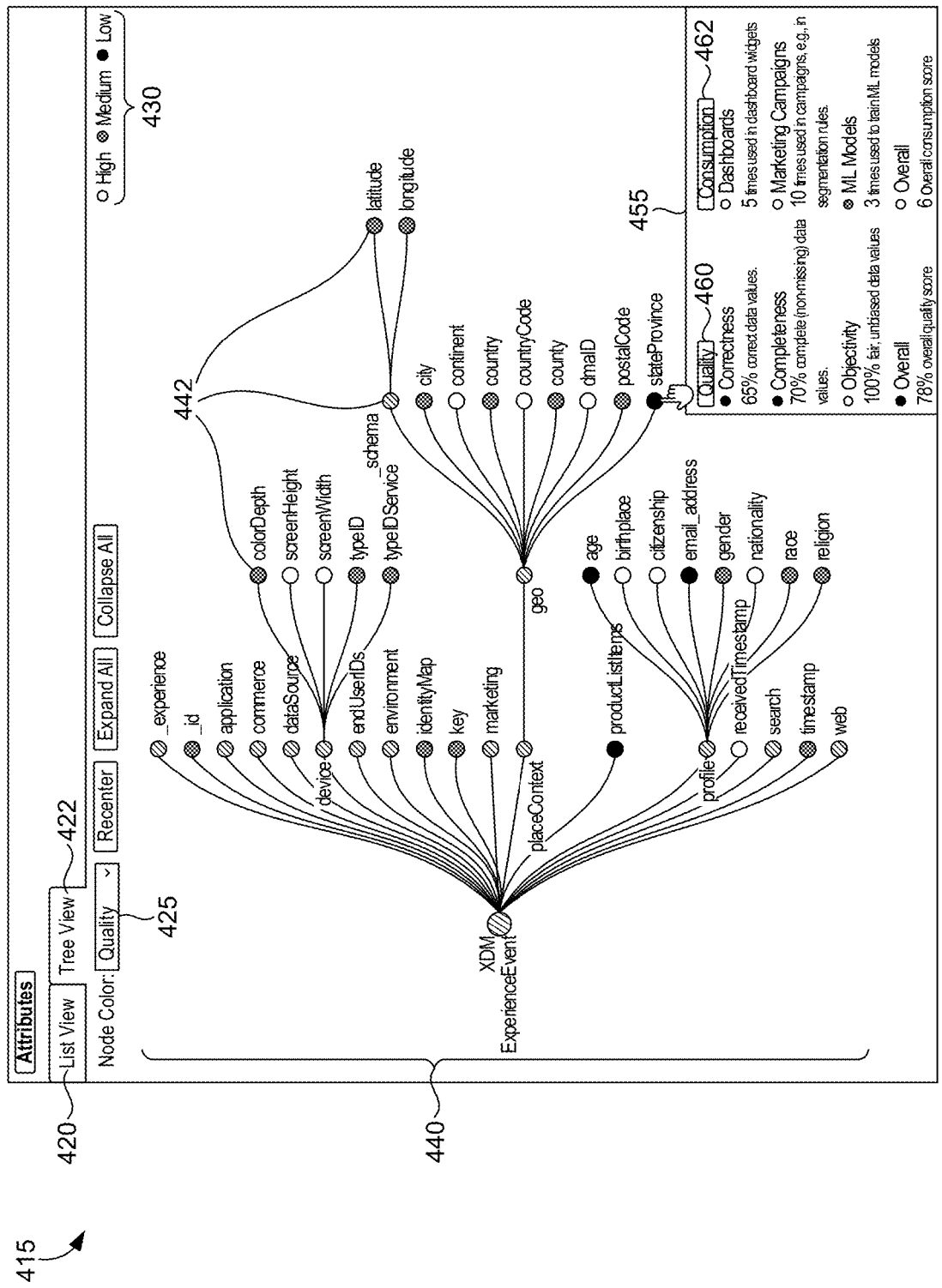

FIG. 4D illustrates an example interactive tree viewer 415. In this example, interactive tree viewer 415 visually represents attributes in the dataset and attribute-level metrics for those attributes. In an example implementation, switching between list view tab 420 and tree view tab 422 switches between presenting a list of attributes (and a visual representation of their metrics) and presenting interactive node tree 440. Interactive node tree 440 represents a hierarchy of nested attributes in a selected dataset in a tree form. In this example, expandable parent nodes are illustrated in FIG. 4D with a shading pattern. In some embodiments, the different nodes (e.g., nodes 442) in interactive node tree 440 include a visual representation of the health of their corresponding attributes, such as a numeric or graphical representation (e.g., a glyph) representing the value of that attribute's data metric(s) (e.g., quality, consumption, utility, overall). In some embodiments, a glyph visually represents one or more data metrics, for example, like a pie graph with different colored, shaded, or patterned regions corresponding to different (e.g., configurable) metrics (e.g., overall quality and overall consumption), with different colors, gradients, and/or patterns corresponding to different (e.g., configurable) health ranges (e.g., low, medium, high), as illustrated by legend 430). In some embodiments, an interaction element (e.g. dropdown menu 425) accepts input reconfiguring which type(s) of metric (e.g., quality, consumption, data utility, overall) the nodes (e.g., node colors) in interactive node tree 440 represent, upon which the visual emphasis of the nodes in interactive node tree 440 is updated to reflect the metrics of the selected type(s). In some embodiments, interactive tree viewer 415 supports interaction through hovering, panning, zooming, expanding and/or collapsing attribute nodes (e.g., nodes 442).

In some embodiments, interacting with (e.g., hovering over, clicking or tapping, clicking or tapping and holding on) a representation of an attribute or its metric(s) in interactive node tree 440 causes display of a representation of (e.g., a tooltip such as tooltip 455 that shows) that attribute's metrics (e.g., quality 460, consumption 462). In an example implementation, each metric includes a visual representation of the value of the metric for that attribute, such as a numeric or graphical representation of that metric's value.

Figure 5A:
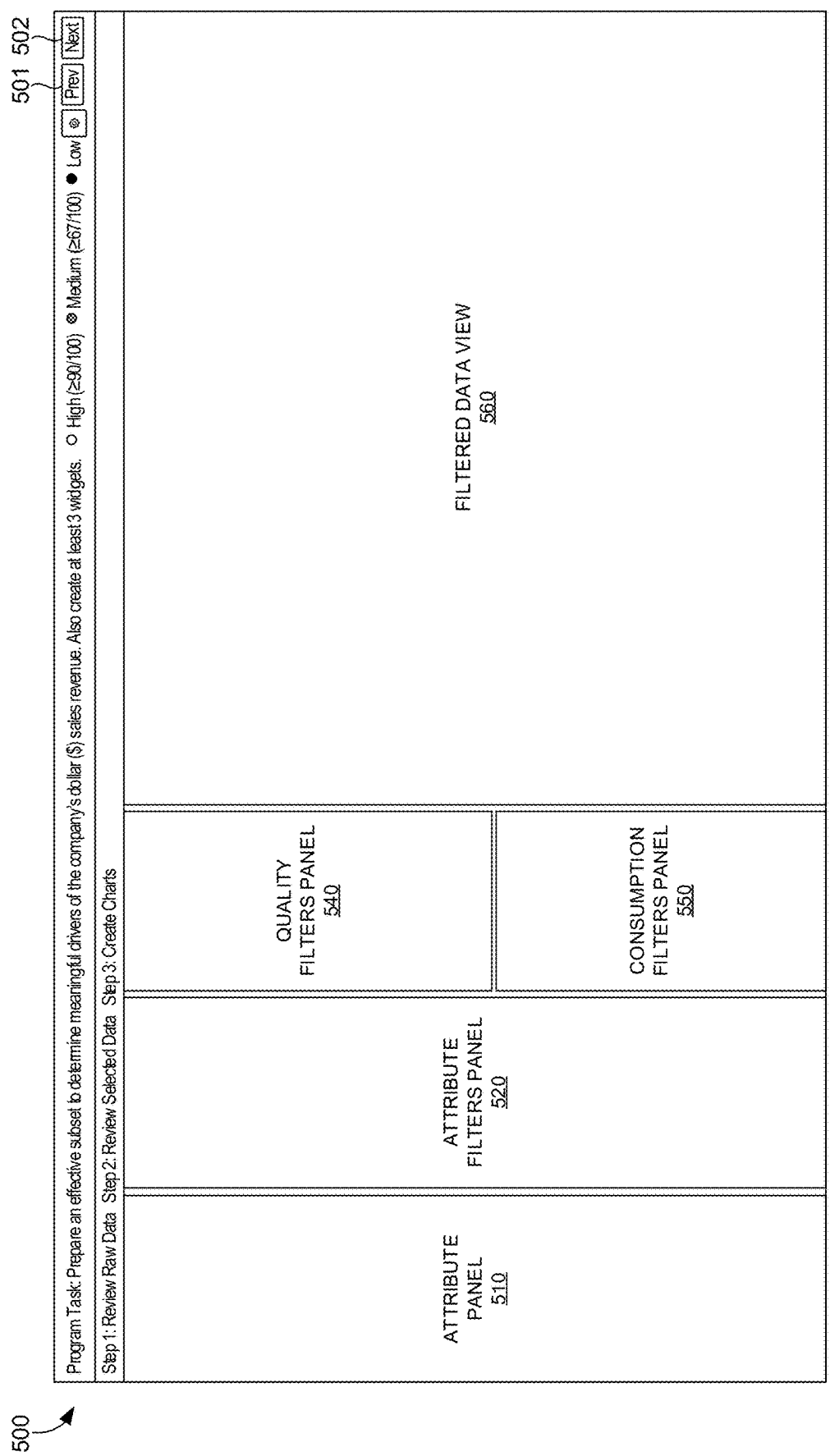
FIGS. 5A-5F illustrate an example data selection interface, in accordance with embodiments of the present invention.
Figures 5B, 5C, 5D, 5E:
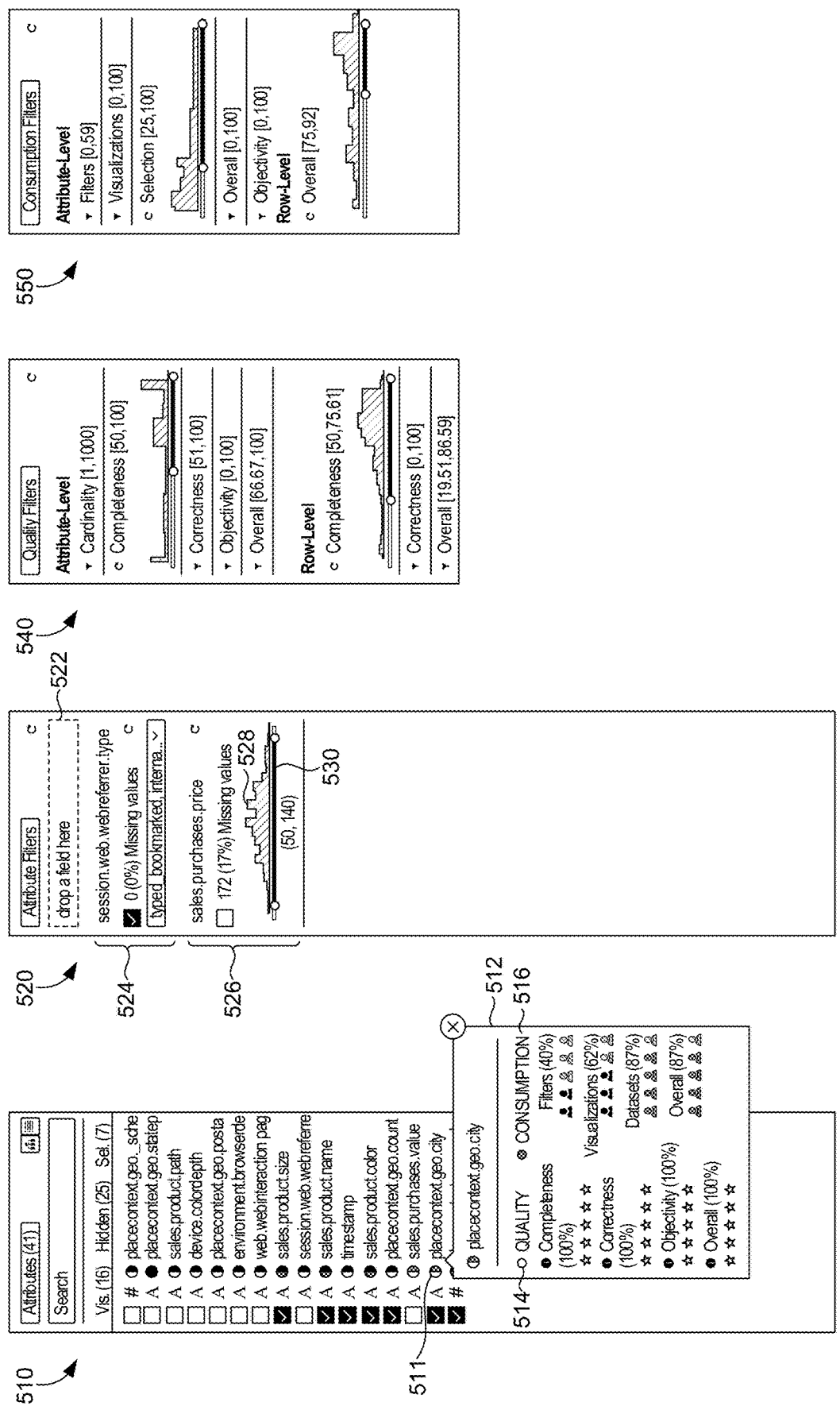
Figure 5F:
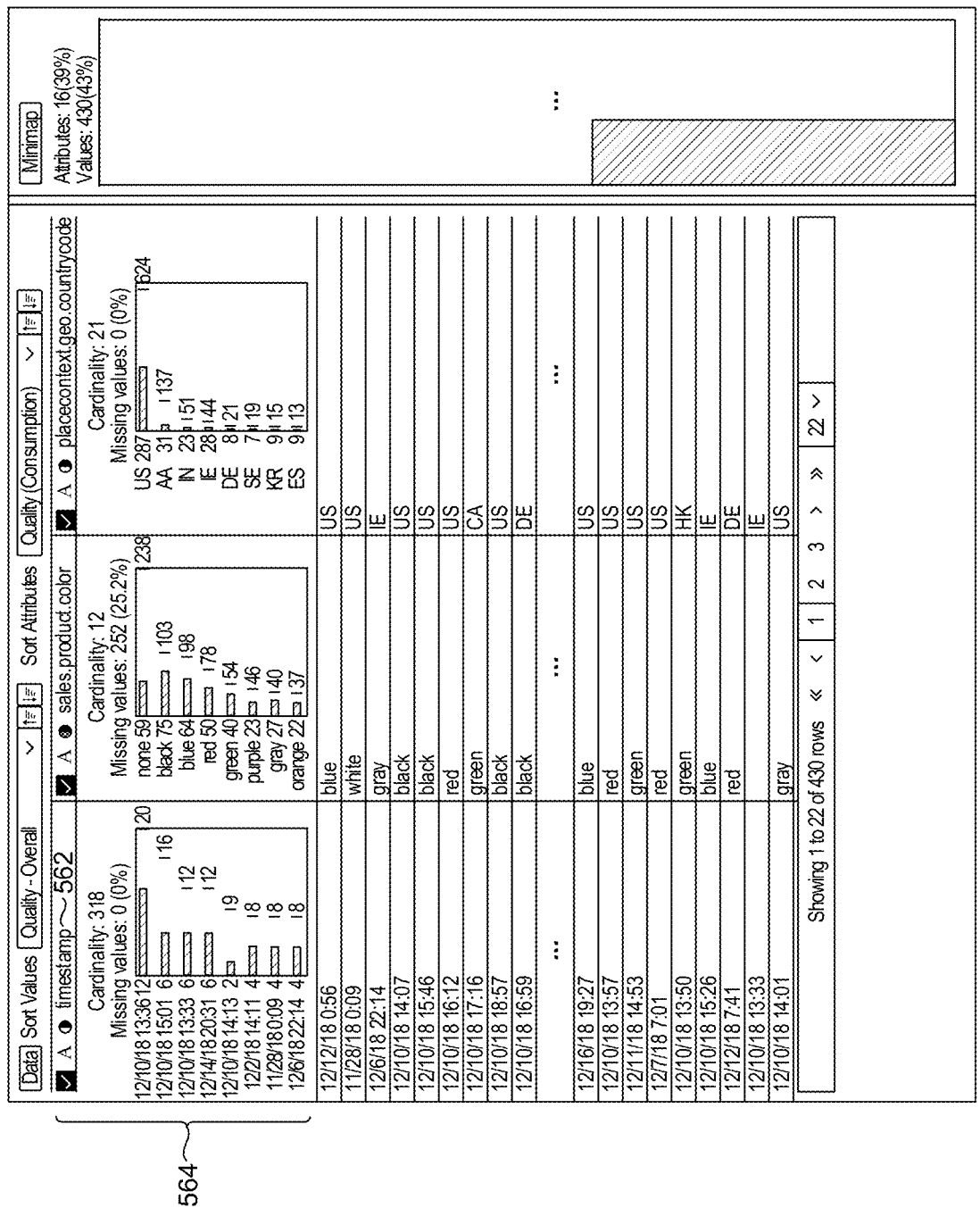
Figure 6A:
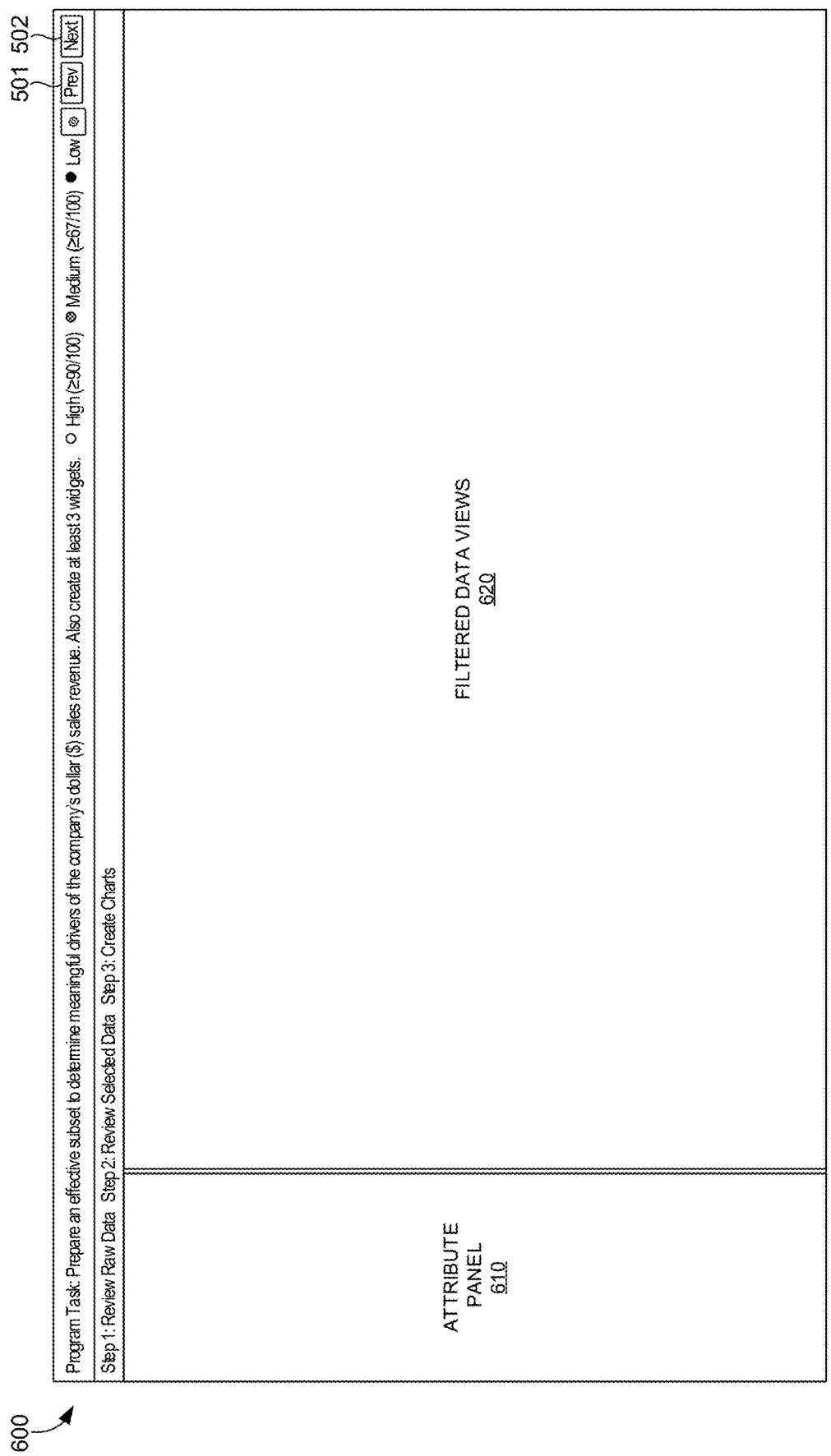
FIGS. 6A-6C illustrate an example data selection review interface, in accordance with embodiments of the present invention.
Figure 6B:
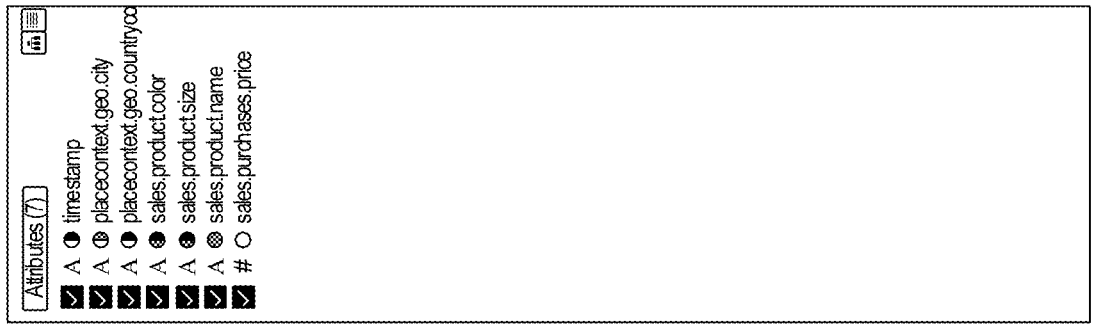
Figure 6C:
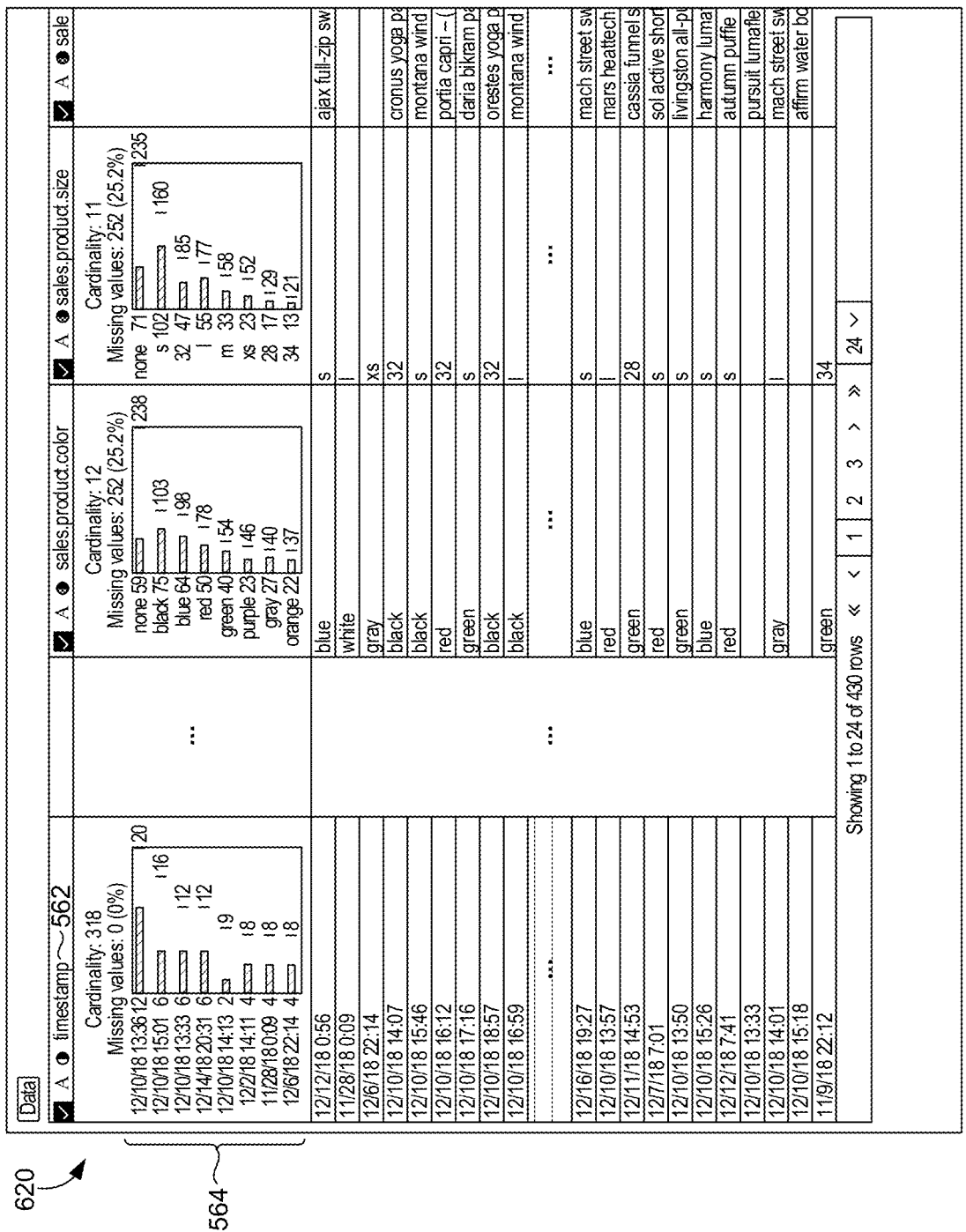
Figure 7A:
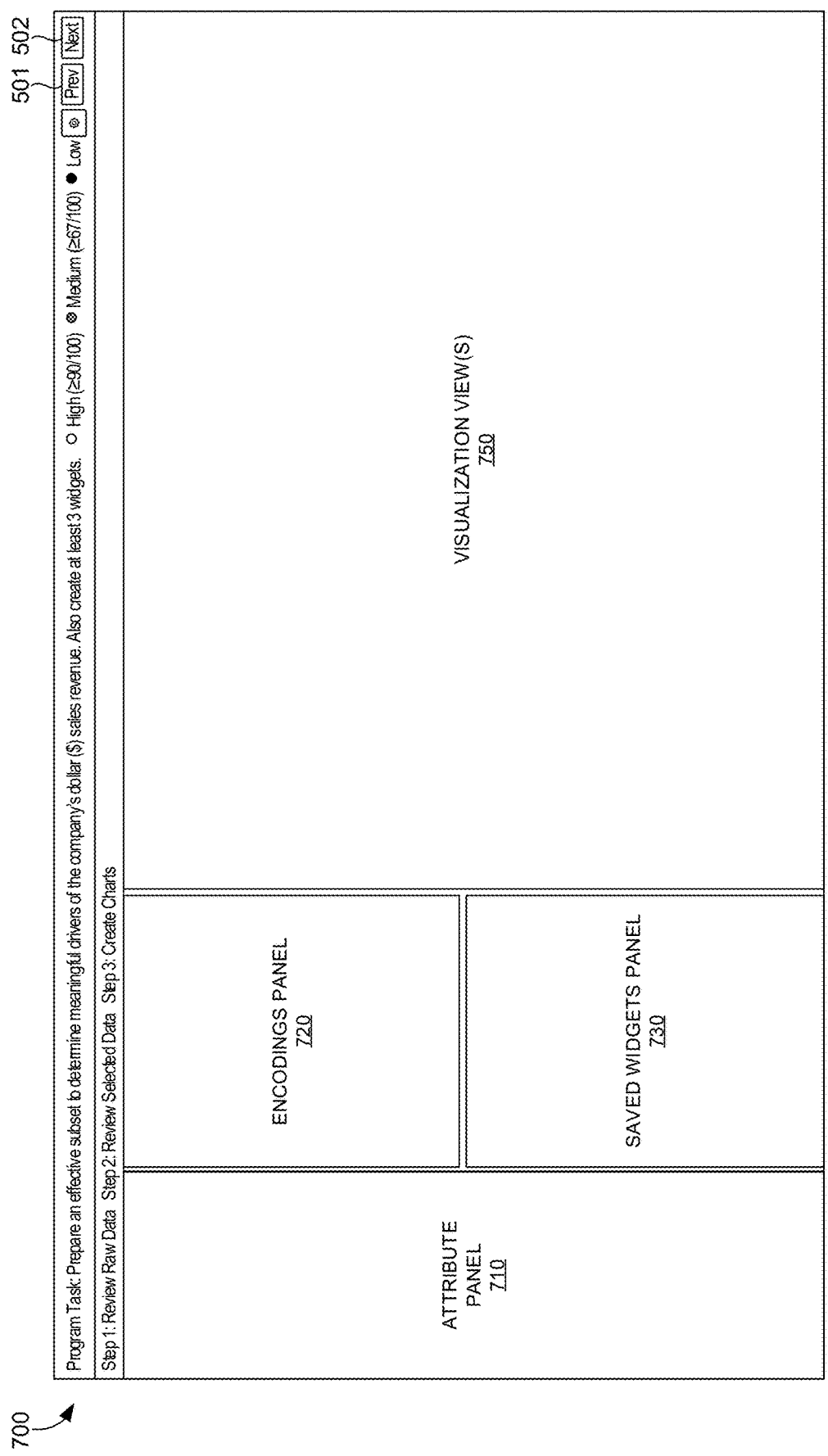
FIGS. 7A-7E illustrate an example data visualization interface, in accordance with embodiments of the present invention.

FIGS. 5-7 illustrate example data selection, review, and visualization interfaces, in accordance with embodiments of the present invention. In an example embodiment, the user interfaces illustrated in FIGS. 5-7 are incorporated into a data selection or monitoring tool (e.g., data selection interface 116 and/or data quality monitoring interface 118 of FIG. 1). More specifically, FIGS. 5-7 illustrate an example sequence of interfaces from data selection interface 500 of FIG. 5A, to data review interface 600 of FIG. 6A, to data visualization interface 700 of FIG. 7A. At a high level, previous and next buttons 501 and 502 navigate from one interface to another. In an example implementation, a user navigates, explores, and applies various filters to a dataset to select records and/or attributes from the dataset using data selection interface 500, reviews (and/or modifies) the selected data using data review interface 600, and builds a visualization (or widget) of the selected data using data visualization interface 700.

FIGS. 5A-5F illustrate an example data selection interface, in accordance with embodiments of the present invention. In an example implementation, an interface (not depicted) accepts input selecting or otherwise identifying a dataset to navigate for selection of a subset of the dataset. FIG. 5A shows an example landing page presented upon selecting or otherwise identifying a dataset. In FIG. 5A, data selection interface 500 shows an attributes view (e.g., attribute panel 510) that presents the attributes in a selected dataset along with their name and datatypes, an attribute filters view (e.g., attribute filters panel 520) that accepts input applying filters to designated attributes, a quality filters view (e.g., quality filters panel 540) that accepts input filtering a selected dataset based on data quality metrics at an attribute and/or record-level, a consumption filters view (e.g., consumption filters panel 550) that accepts input filtering a selected dataset based on data consumption metrics at an attribute and/or record-level, and a data view (e.g., filtered data view 560) that shows the filtered dataset, for example, as data table with a visual data profile for each selected attribute.

FIG. 5B illustrates an example attribute panel 510. In this example, attribute panel 510 presents a representation (e.g., an interactive list, interactive tree) of the attributes in the selected dataset along with their names and/or datatypes (e.g., designated by icons, symbols, or some other visual representation, such as "A" for text type and "#" for numeric type, as illustrated in FIG. 5B). In an example embodiment, a search field accepts (e.g., keyword) input that triggers a search for matching attributes (e.g., attributes with matching names), and the matching attributes are presented. In some embodiments, attribute panel 510 provides an interaction element that toggles between representing the (matching) attributes in a list and tree view (such as interactive tree viewer 415 of FIG. 4D), and/or other representations, as some views may be more helpful, for example, if a dataset follows a nested schema. In some implementations, hovering over, clicking or tapping, clicking or tapping and holding on, and/or otherwise interacting with a particular attribute (name) causes display of a representation of (e.g., a tooltip that shows) a description for that attribute.

In some embodiments, each (matching) attribute is selectable (e.g., via as associated interaction element such as a checkbox) and/or includes a visual representation of the health of the attribute, such as a numeric or graphical representation (e.g., glyph 511) representing the value of that attribute's data metric(s) (e.g., quality, consumption, utility, overall). In some embodiments, a glyph (e.g., glyph 511) visually represents multiple data metrics, for example, like a pie graph with different colored, shaded, or patterned regions corresponding to different metrics (e.g., overall quality and overall consumption), with different colors, gradients, and/or patterns corresponding to different health ranges (e.g., low, medium, high). In some embodiments, the data metric(s), ranges, and/or visual emphasis (e.g., colors, gradients, and/or patterns) are configurable. In an example implementation, interacting with (e.g., hovering over, clicking or tapping, clicking or tapping and holding on) a representation of an attribute or its metric(s) (e.g., glyph 511) causes display of a representation of (e.g., an overlay window such as tooltip 512 that shows) that attribute's metrics (e.g., quality metrics 514, consumption metrics 516). In an example implementation, each metric includes a visual representation of the value of the metric for that attribute, such as a numeric or graphical representation of that metric's value. In the example illustrated in FIG. 5B, the placecontext.geo.city attribute has a completeness of 100%, visualized on a 5-point star rating system.

FIG. 5C illustrates an example attribute filters panel 520. In this example, attribute filters panel 520 accepts input designating any attribute (e.g., by dragging them from attribute panel 510 onto field 522) and applying one or more filters to the values of the attribute in the selected dataset to select certain record (e.g., rows) from the dataset. In some embodiments, different filtering element(s) are provided based on data type. In the example illustrated in FIG. 5C, two attributes have been selected, with the session.web.webreferrer.type attribute having a multiselect dropdown to filter records by categorical value (524), and the sales.purchases.price attribute having range-slider to filter records by numerical value (526). In some embodiments, range-sliders are scented with the distributions of all values for the attribute (bar 530) and/or the filtered values (distribution 528).

FIG. 5D illustrates an example quality filters panel 540. In this example, quality filters panel 540 accepts input filtering a selected dataset based on values of attribute-level and/or record-level data quality metrics. In an example implementation, quality filters panel 540 represents an (e.g., expandable) filter for supported attribute-level and/or record-level data quality metrics, where each filter accepts input designating (e.g., a range of) values and filters for matching records having the designated (range of) values for a corresponding metric. For example, as illustrated in FIG. 5D, applying the Row Completeness filter of [50, 100] filters out all data values (rows) that have completeness (i.e., presence of null values) outside of this range. In some embodiments, range-sliders are scented with the distributions of all values for the attribute and/or the filtered values.

FIG. 5E illustrates an example consumption filters panel 550. In this example, consumption filters panel 550 accepts input filtering a selected dataset based on values of attribute-level and/or record-level data consumption metrics. In an example implementation, consumption filters panel 550 represents an (e.g., expandable) filter for supported attribute-level and/or record-level data consumption metrics, where each filter accepts input designating (e.g., a range of) values and filters for matching records having the designated (range of) values for a corresponding metric. For example, applying a Visualization consumption filter of [39, 95] filters out all data attributes that have been used in different visual encodings by a percentage of past users outside the designated range. In some embodiments, range-sliders are scented with the distributions of all values for the attribute and/or the filtered values.

FIG. 5F illustrates an example filtered data view 560. In this example, filtered data view 560 shows the selected dataset as a data table and/or a visual data profile for each (e.g., attribute (e.g., profile 564). In some embodiments, filtered data view 560 shows values of selected attributes (e.g., selected using attribute panel 510 and/or attribute filters panel 520), and rows that result from applying various filters (e.g., using attribute filters panel 520, quality filters panel 540, consumption filters panel 550, and/or filters for data utility metrics). In some embodiments, the visual data profile for each (selected) attribute visually represents numerical attributes (e.g., using an area chart) and/or categorical attributes (e.g., using a bar chart, illustrating all distributions of all values vs. filtered values for the attribute) to facilitate a more efficient review of the dataset and the selected data. Additionally or alternatively, the visual data profile visually represents one or more attribute-level metrics for each (selected) attribute (e.g., cardinality, completion). For example, for filtered data view 560 displays data timestamp attribute 562 in a corresponding column, displays its cardinality (318 unique values) and percent of filtered records with missing values (0%), and displays a bar chart showing the distributions of unique values (filtered values represented by the shaded bar, all values represented by the vertical line and data annotation). In some embodiments, filtered data view 560 represents each (selected) attribute with an associated visual representation (e.g., a glyph) of the health of the attribute, for example, like a pie graph with different colored, shaded, or patterned regions corresponding to one or more (e.g., configurable) metrics (e.g., overall quality and overall consumption), with different colors, gradients, and/or patterns corresponding to different (e.g., configurable) health ranges (e.g., low, medium, high) to facilitate a more efficient understanding of the heath of that attribute. In some embodiments, standard data table operations such as search, pagination, sorting are enabled. Additionally or alternatively, filtered data view 560 provides one or more sorting functions that accept input sorting by attributes and/or records by quality metrics (e.g., attribute or record completeness) and/or consumption metrics (e.g., usage in datasets), to facilitate a more efficient selection of high quality and/or commonly consumed data.

In some embodiments, upon selecting a desired set of data, the user navigates to the next screen (e.g., via next button 502 of FIG. 5A) to cause display of a data selection review interface (e.g. data selection review interface 600 of FIG. 6A or data visualization interface 700 of FIG. 7A). FIGS. 6A-6C illustrates an example data selection review interface, in accordance with embodiments of the present invention. Starting with FIG. 6A, in this example, data selection review interface 600 provides an intermediate step where users can "Review" their selected dataset, i.e., data attributes and values from the previous step before moving to the next step (e.g., via next button 502 of FIG. 6A). Data selection review interface 600 includes attribute panel 610 and filtered data view 620. FIG. 6B shows an example attribute panel 610, and FIG. 6C shows an example filtered data view 620.

FIGS. 7A-7E illustrate an example data visualization interface 700, in accordance with embodiments of the present invention. Starting with FIG. 7A, data visualization interface 700 accepts input creating visualizations and/or widgets, for example, for use in monitoring dashboards or presentations. In FIG. 7A, data visualization interface 700 shows an attributes view (e.g., attribute panel 710) that presents the selected attributes in the dataset along with their name and datatypes, an encodings view (e.g., encodings panel 720) that accepts input selecting a chart type and assigning visual encodings, a visualization canvas (e.g., visualization view 750) that shows a visualization of the selected data using the selected chart type and visual encodings, and a saved widgets view (e.g., saved widgets panel 730) that shows a representation of the previously created visualizations or widgets saved by the user.

Figures 7B, 7C, 7D:
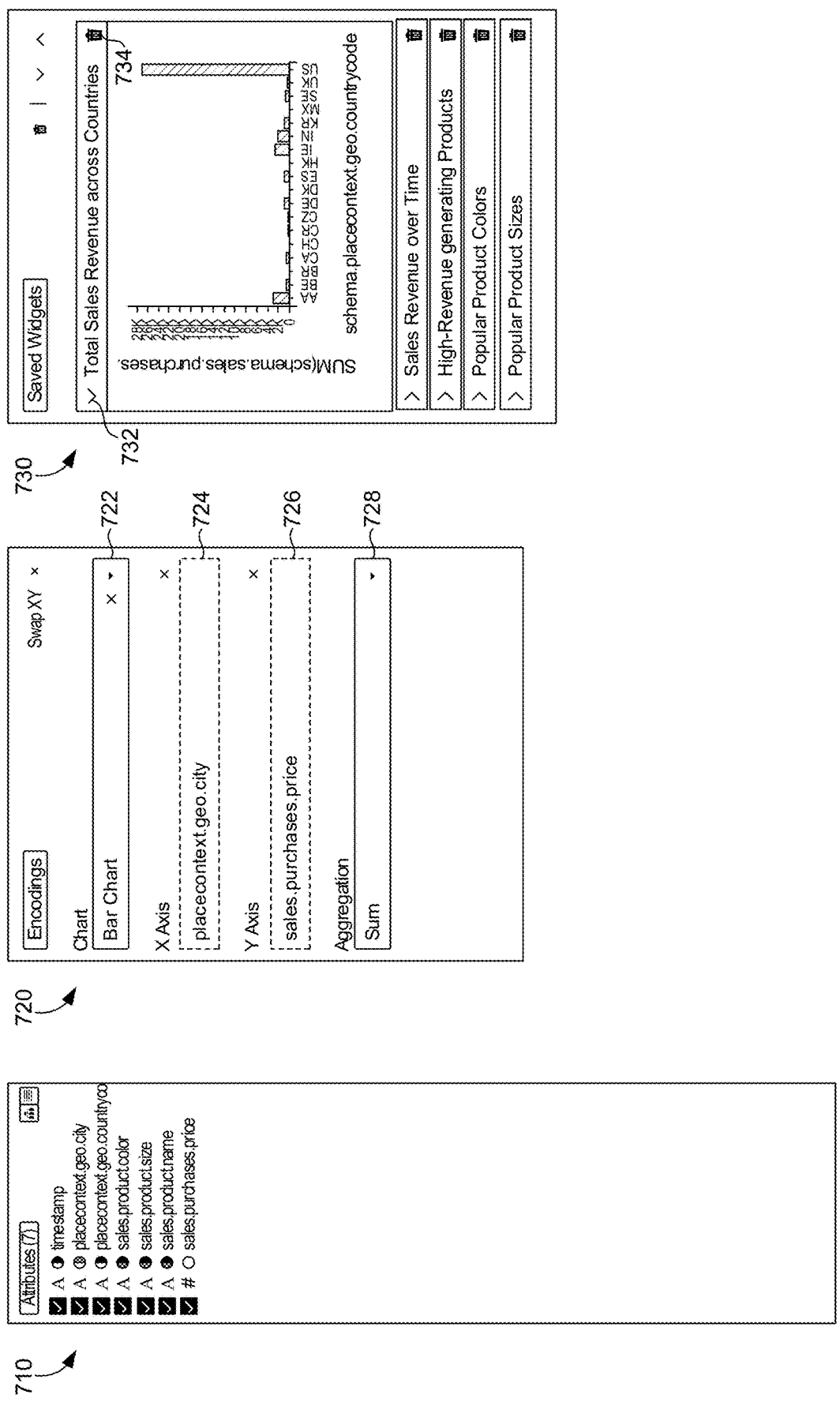

FIG. 7B illustrates an example attribute panel 710, which in some embodiments, corresponds to the attribute panels illustrated in FIG. 5A or 5B (attribute panel 510) and/or FIGS. 6A and/or 6B (attribute panel 610).

FIG. 7C illustrates an example encodings panel 720. In this example, an interaction element (e.g., multiselect dropdown 722) accepts input selecting a desired chart type (e.g., bar chart, scatterplot) for a visualization or widget. In some embodiments, encodings panel 720 accepts input assigning attributes to particular visual encodings for a visualization or widget (e.g., by dragging and dropping from attributes panel 710 onto corresponding fields 725 and 726 that represent the x and y axes, respectively). In some embodiments, an interaction element (e.g., multiselect dropdown 728) accepts input selecting a type of aggregation encoding. By way of nonlimiting example, take a bar chart where cities are mapped to the x-axis (each bar represents a different city), and daily sales in each city are mapped to the y-axis. In some embodiments, a specified aggregation encoding determines how the values of one of the encodings (here, the sales) are aggregated and represented on the visualization or widget (e.g., minimum, maximum, average, sum).

Figure 7E:
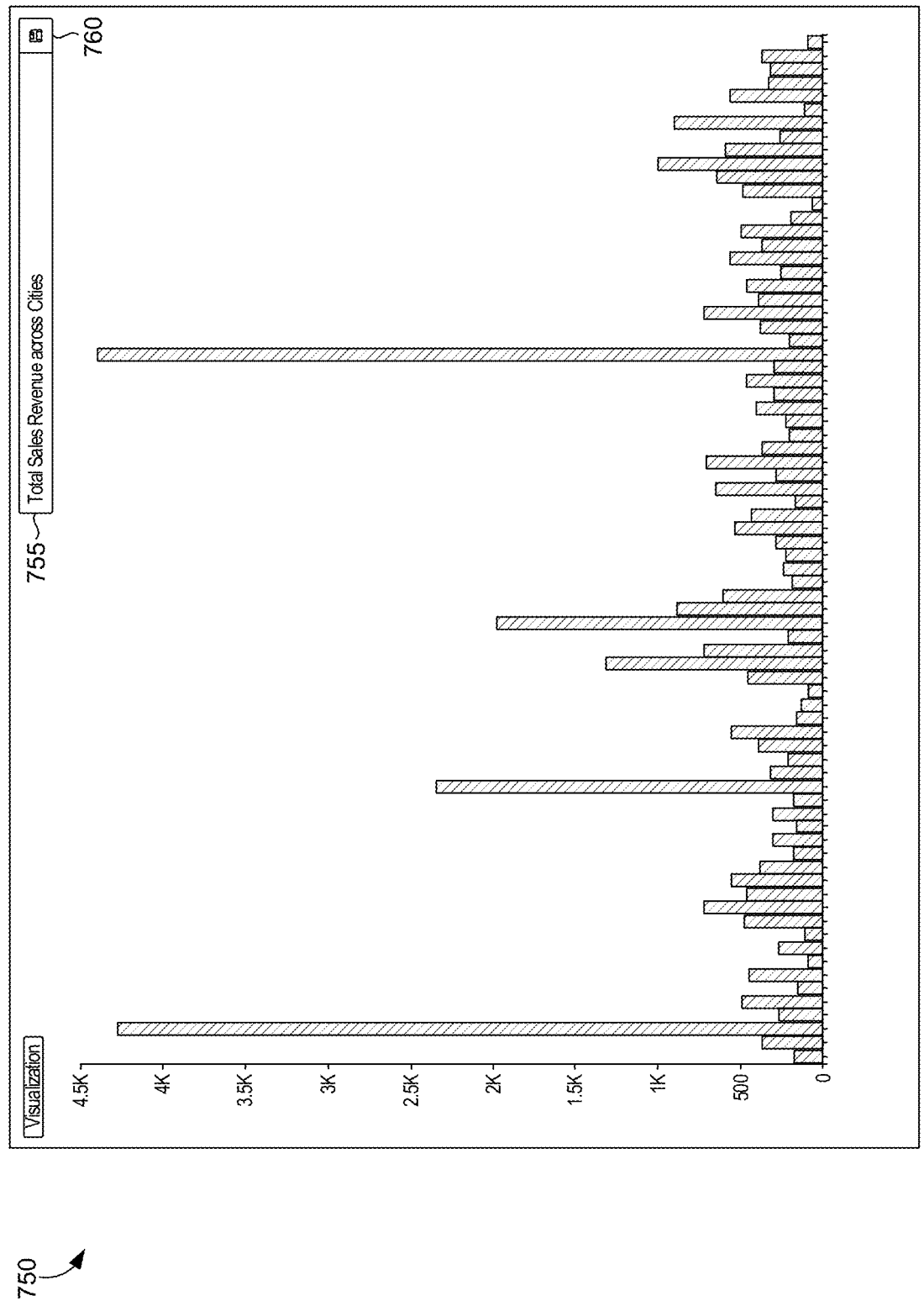

FIG. 7E illustrates an example visualization view 750. In this example, visualization view 750 shows the visualization or widget configured using encodings panel 720. Title field 755 accepts a title, save button 760 saves the visualization or widget (e.g., to saved widgets panel 730). In various embodiments, visualization view 750 supports any number of visualization or widget formatting.

FIG. 7D illustrates an example saved widgets panel 730. In this example, saved widgets panel 730 represents each saved visualization (or widget), provides an interaction element (dropdown arrow 732) to expand or collapse the visualizations, and/or provides an interaction element (e.g., trash can 734) to delete the saved visualizations.

Example Flow Diagrams

With reference now to FIGS. 8-13, flow diagrams are provided illustrating various methods. Each block of the methods 800-1300 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Figure 8:
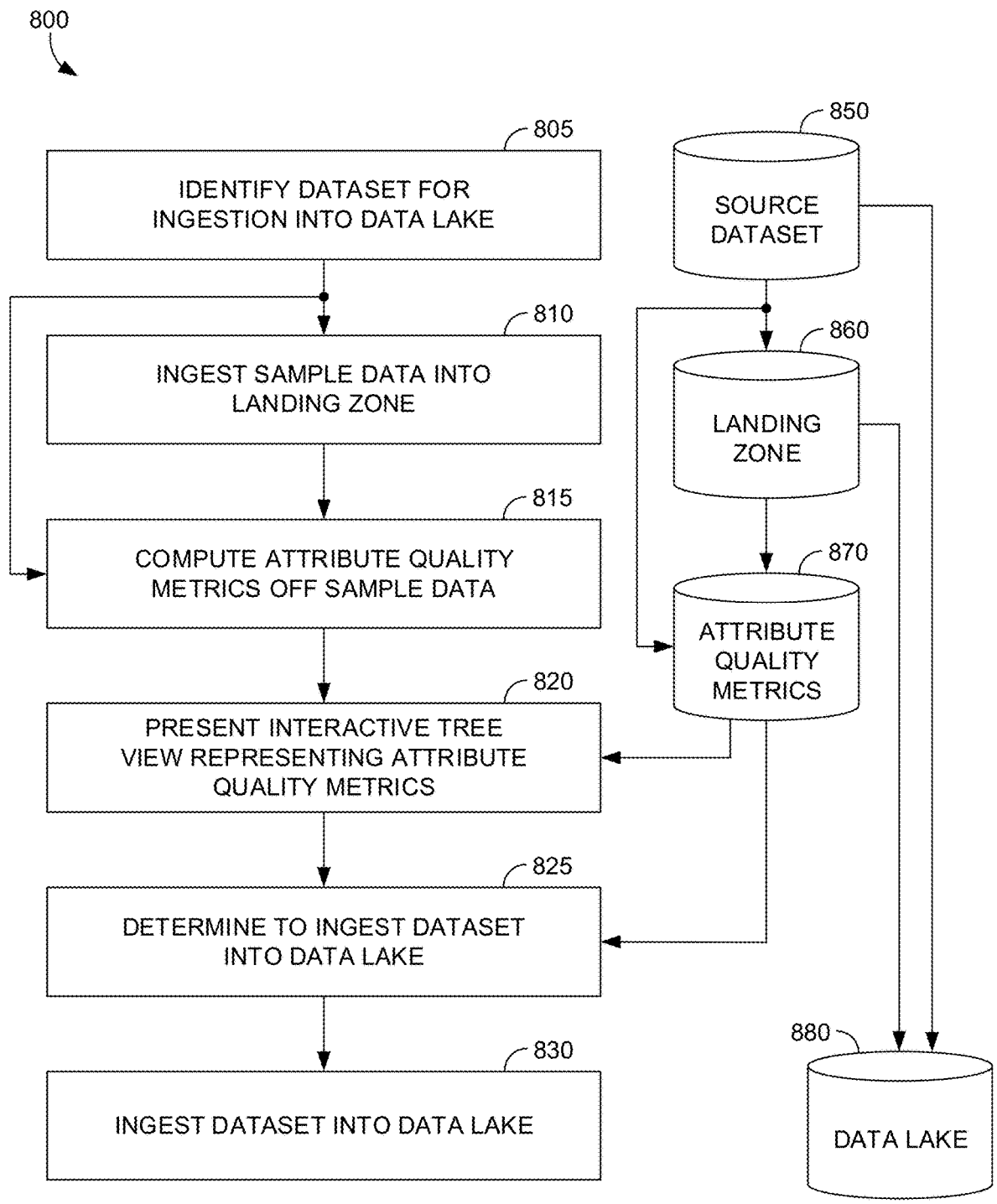
FIG. 8 is a flow diagram showing a method for data ingestion, in accordance with embodiments of the present invention.

FIG. 8 illustrates a method and example data flow 800 for data ingestion, in accordance with some embodiments. Initially at block 805, dataset 850 is identified for ingestion into data lake 880. For example, a user interface accepts input selecting or otherwise identifying a dataset. At block 810, sample data is ingested from dataset 850 into landing zone 860. In an example implementation, data ingestion interface 114 and/or data ingestion component 170 of FIG. 1 ingests some fraction of dataset 850 into landing zone 860, such as 1% or the first 1000 records. At block 815, attribute quality metrics 870 are computed off the sample data. In some embodiments, attribute quality metrics 870 are computed off the sample data while streaming into landing zone 860. Additionally or alternatively, attribute quality metrics 870 are computed off the sample data stored in landing zone 860.

At block 820, an interactive tree view representing attribute quality metrics 870 is presented. By way of nonlimiting example, a user interface such as interactive tree viewer 415 of FIGS. 4A and 4D visually represents the attributes in dataset 850 and their attribute quality metrics 870.

At block 825, a determination is made to ingest dataset 850 into data lake 880. In some embodiments, the determination is made based on user input confirming a desire to continue with the ingestion process after reviewing attribute quality metrics 870 using the interactive tree view. In some embodiments, thresholds for attribute quality metrics 870 are automatically applied to determine to ingest dataset 850. At block 830, dataset 850 is ingested into data lake 880. In some embodiments, this includes moving the sample data from landing zone 860 into data lake 880.

Figure 9:
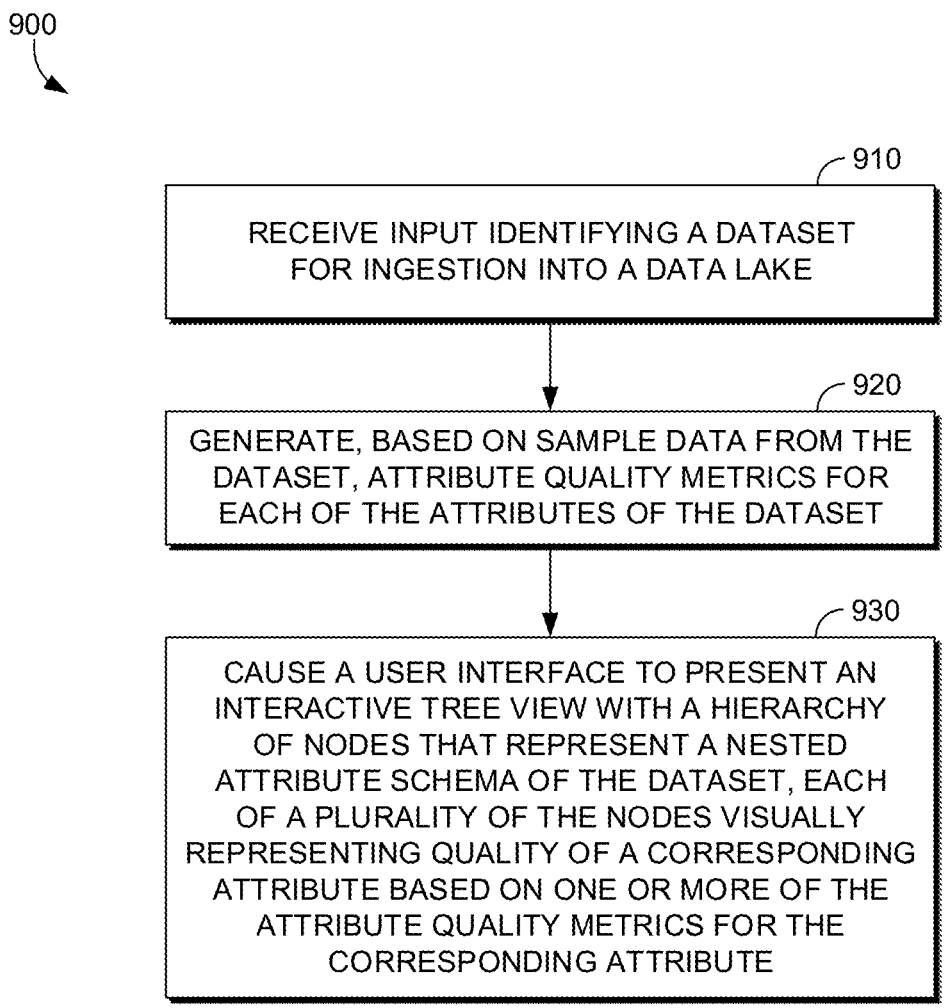
FIG. 9 is a flow diagram showing a method for representing attribute quality using an interactive tree view, in accordance with embodiments of the present invention.

FIG. 9 illustrates a method 900 for representing attribute quality using an interactive tree view, in accordance with some embodiments. Initially at block 910, input is received identifying a dataset for ingestion into a data lake. At block 920, attribute quality metrics for each of the attributes of the dataset are generated based on sample data from the dataset. At block 930, a user interface is caused to present an interactive tree view with a hierarchy of nodes that represent a nested attribute schema of the dataset. Each of a plurality of the nodes visually represent quality of a corresponding attribute based on one or more of the attribute quality metrics for the corresponding attribute.

Figure 10:
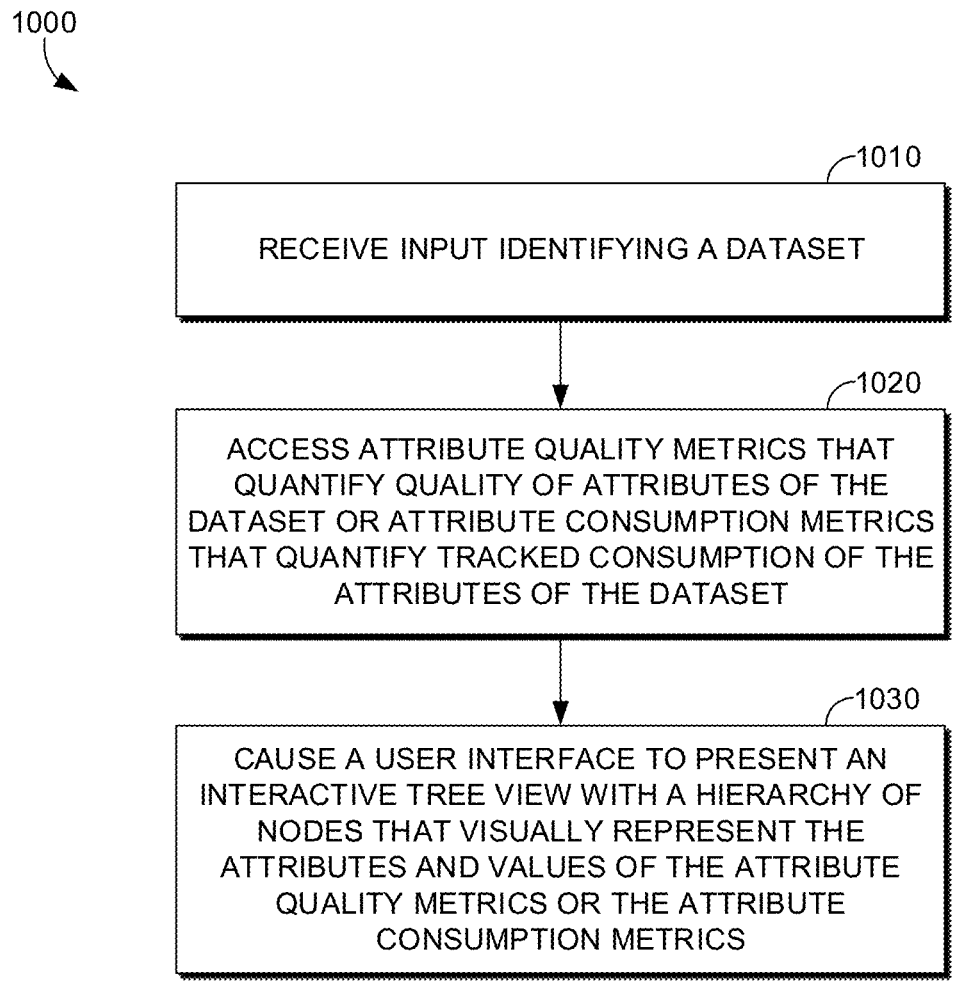
FIG. 10 is a flow diagram showing a method for representing attribute quality or consumption using an interactive tree view, in accordance with embodiments of the present invention.

FIG. 10 illustrates a method 1000 for representing attribute quality or consumption using an interactive tree view, in accordance with some embodiments. Initially at block 1010, input is received identifying a dataset. At block 1020, attribute quality metrics that quantify quality of attributes of the dataset or attribute consumption metrics that quantify tracked consumption of the attributes of the dataset are accessed. At block 1030, a user interface is caused to present an interactive tree view with a hierarchy of nodes that visually represent the attributes and values of the attribute quality metrics or the attribute consumption metrics.

Figure 11:
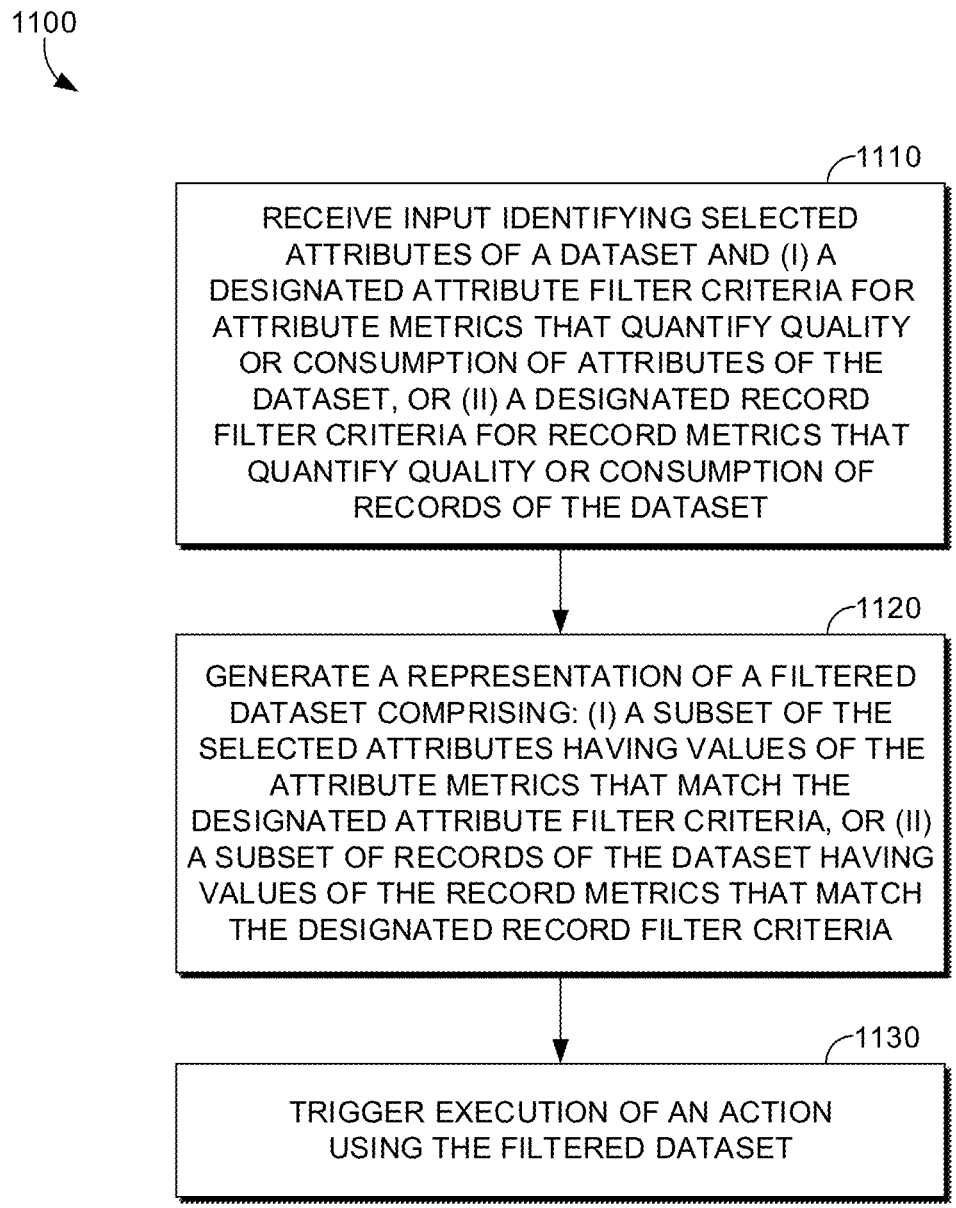
FIG. 11 is a flow diagram showing a method for selecting a filtered dataset, in accordance with embodiments of the present invention.

FIG. 11 illustrates a method 1100 for selecting a filtered dataset, in accordance with some embodiments. Initially at block 1110, input is received identifying selected attributes of a dataset and (i) a designated attribute filter criteria for attribute metrics that quantify quality or consumption of attributes of the dataset, or (ii) a designated record filter criteria for record metrics that quantify quality or consumption of records of the dataset. At block 1120, a representation of a filtered dataset is generated. The filtered dataset includes: (i) a subset of the selected attributes having values of the attribute metrics that match the designated attribute filter criteria, or (ii) a subset of records of the dataset having values of the record metrics that match the designated record filter criteria. At block 1130, execution of an action using the filtered dataset is triggered.

Figure 12:
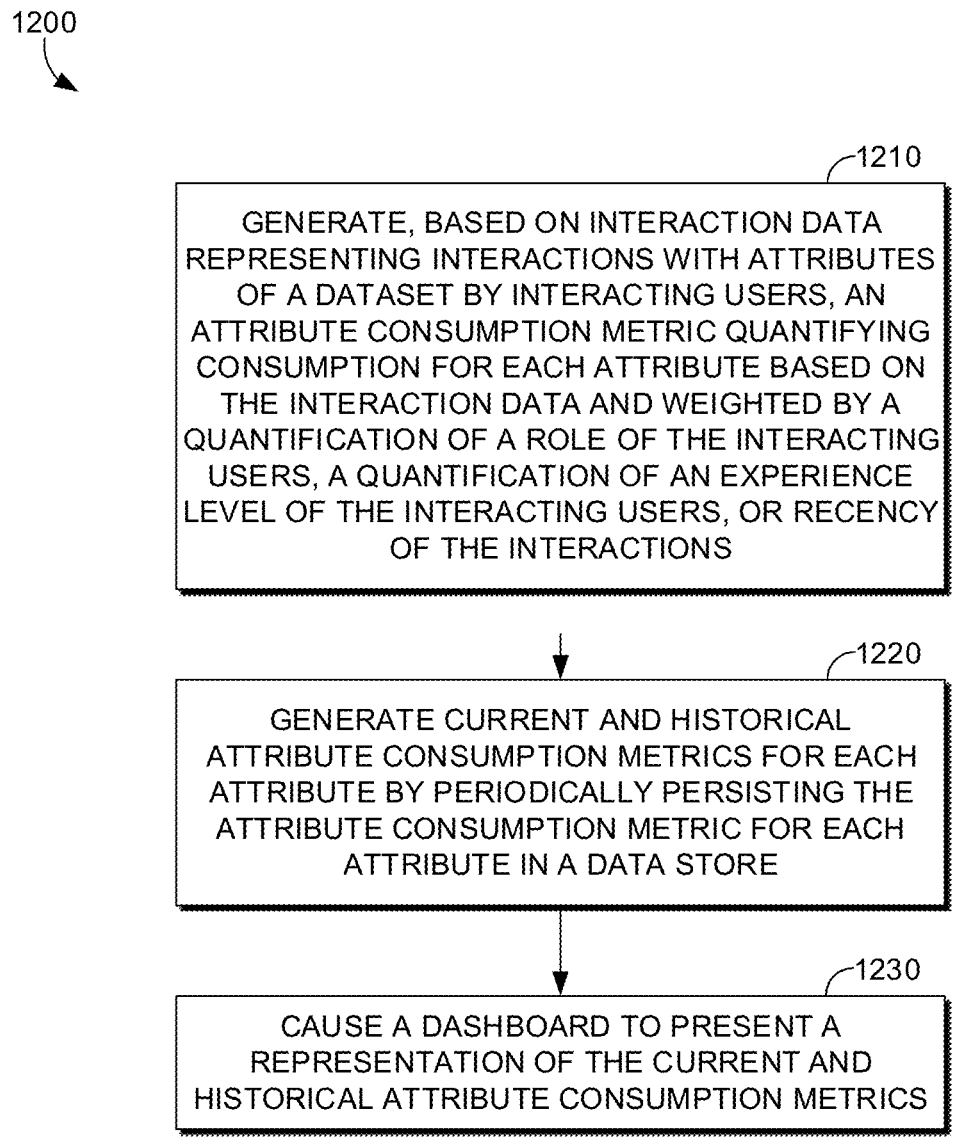
FIG. 12 is a flow diagram showing a method for presenting a representation of current and historical attribute consumption metrics, in accordance with embodiments of the present invention.

FIG. 12 illustrates a method 1200 for presenting a representation of current and historical attribute consumption metrics, in accordance with some embodiments. Initially at block 1210, based on interaction data representing interactions with attributes of a dataset by interacting users, an attribute consumption metric quantifying consumption for each attribute is generated based on the interaction data and weighted by a quantification of a role of the interacting users, a quantification of an experience level of the interacting users, or recency of the interactions. At block 1220, current and historical attribute consumption metrics for each attribute are generated by periodically persisting the attribute consumption metric for each attribute in a data store. At block 1230, a dashboard is caused to present a representation of the current and historical attribute consumption metrics.

Figure 13:
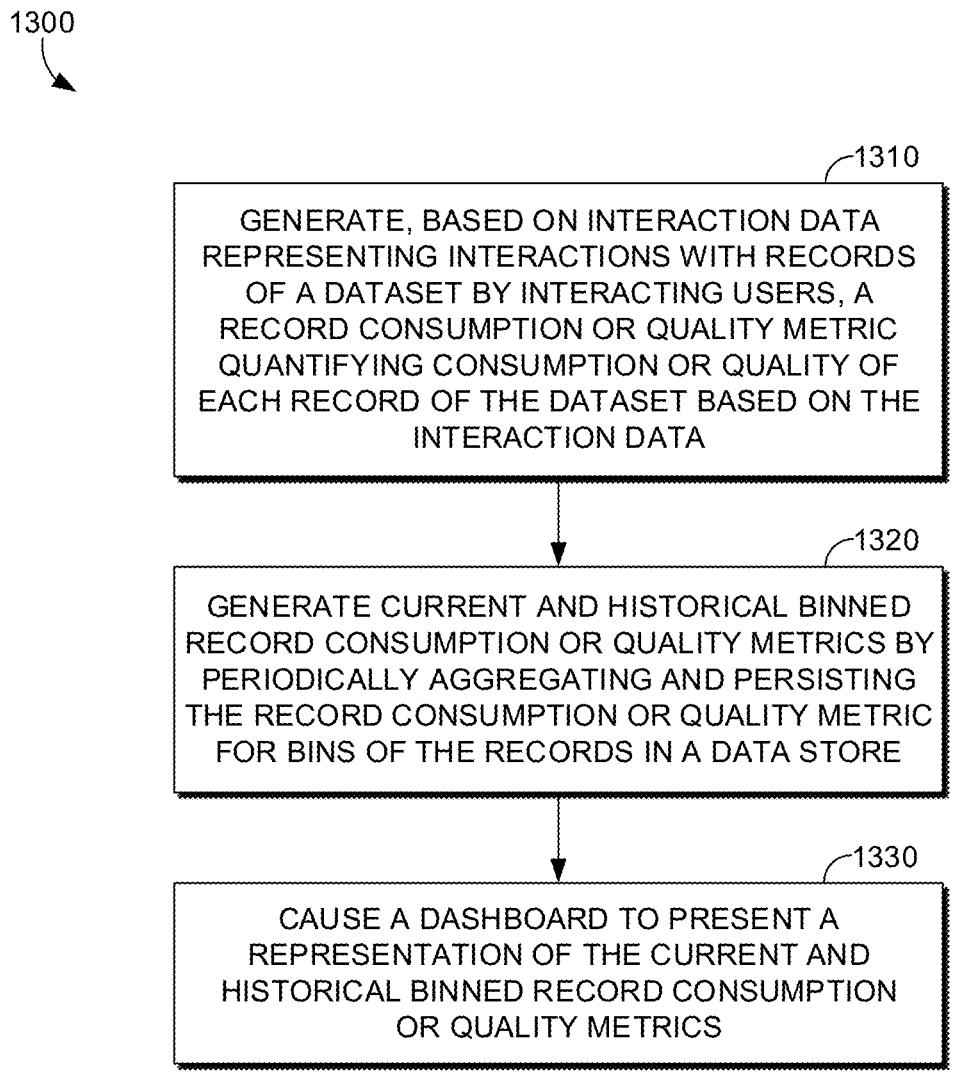
FIG. 13 is a flow diagram showing a method for presenting a representation of current and historical binned record consumption or quality metrics, in accordance with embodiments of the present invention.

FIG. 13 illustrates a method 1300 for presenting a representation of current and historical binned record consumption or quality metrics, in accordance with some embodiments. Initially at block 1310, a record consumption or quality metric quantifying consumption or quality of each record of a dataset is generated based on interaction data representing interactions with records of a dataset by interacting users. At block 1320, current and historical binned record consumption or quality metrics are generated by periodically aggregating and persisting the record consumption or quality metric for bins of the records in a data store. At block 1330, a dashboard is caused to present a representation of the current and historical binned record consumption or quality metrics.

Example Operating Environment

Figure 14:
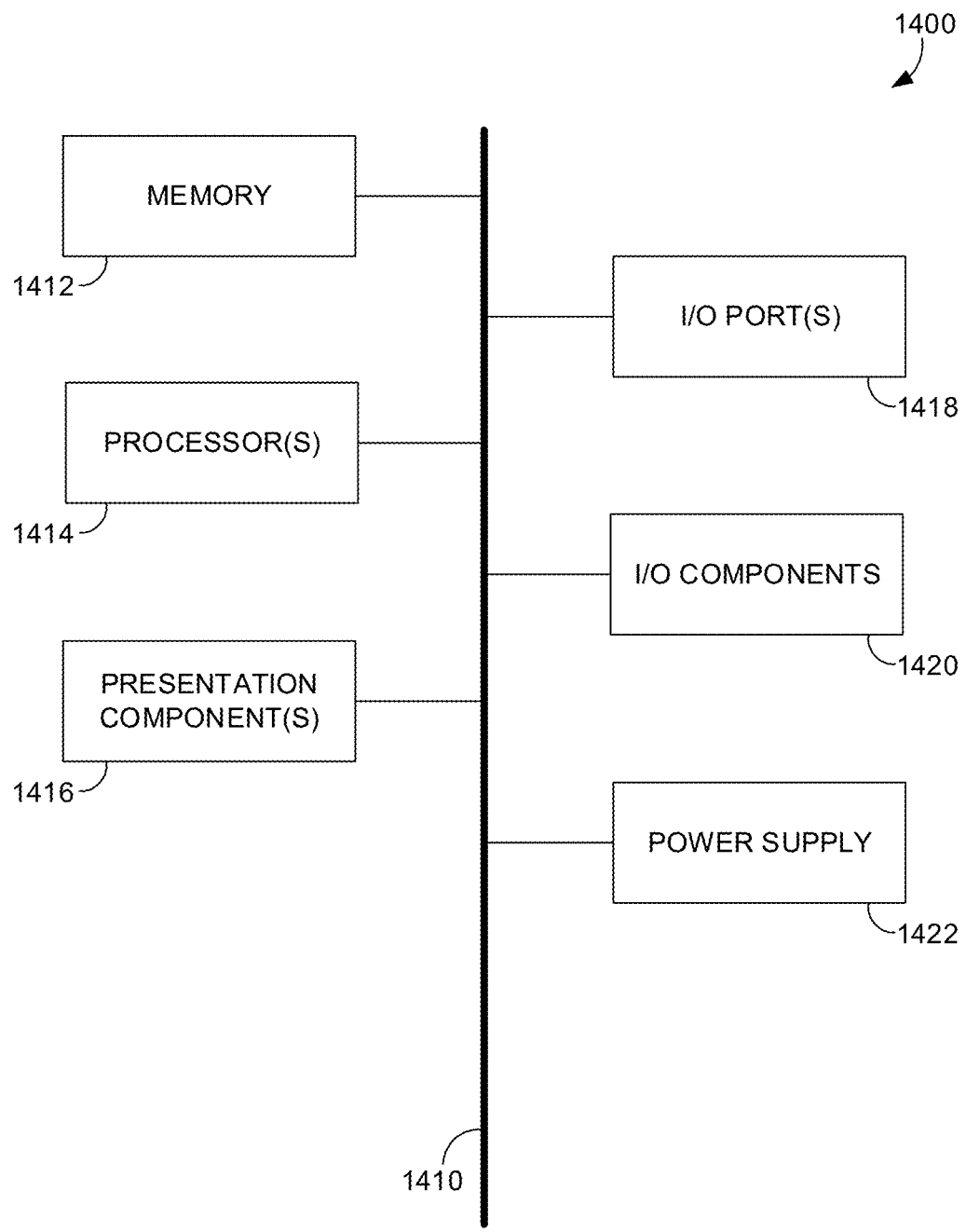
FIG. 14 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 14 in particular, an example operating environment for implementing embodiments of the present invention is shown and designated generally as computing device 1400. Computing device 1400 is but one example of a suitable computing environment and is not intended to suggest any limitation as to the scope of use or functionality of the invention. Neither should computing device 1400 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 14, computing device 1400 includes bus 1410 that directly or indirectly couples the following devices: memory 1412, one or more processors 1414, one or more presentation components 1416, input/output (I/O) ports 1418, input/output components 1420, and illustrative power supply 1422. Bus 1410 represents what may be one or more busses (such as an address bus, data bus, or combination thereof). Although the various blocks of FIG. 14 are shown with lines for the sake of clarity, in some cases, it is not possible to delineate clear boundaries for different components. In this case, metaphorically, the lines would be grey and fuzzy. As such, the diagram of FIG. 14 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 14 and a "computing device."

Computing device 1400 typically includes a variety of computer-readable media. Computer-readable media can be any available media that can be accessed by computing device 1400 and includes both volatile and nonvolatile media, and removable and non-removable media. By way of nonlimiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 1400 includes one or more processors that read data from various entities such as memory 1412 or I/O components 1420. Presentation component(s) 1416 present data indications to a user or other device. Example presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc. The I/O components 1420 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 1400. In some cases, computing device 1400 is equipped with depth cameras, such as stereoscopic camera systems, infrared camera systems, RGB camera systems, touchscreen technology, and combinations of these, for gesture detection and recognition. Additionally or alternatively, the computing device 1400 is equipped with accelerometers or gyroscopes that enable detection of motion, and in some cases, an output of the accelerometers or gyroscopes is provided to the display of computing device 1400 to render immersive augmented reality or virtual reality.

Embodiments described herein support data management, assessment, navigation, and/or discovery. The components described herein refer to integrated components of a data management, assessment, navigation, and/or discovery system. The integrated components refer to the hardware architecture and software framework that support functionality using the data management, assessment, navigation, and/or discovery system. The hardware architecture refers to physical components and interrelationships thereof and the software framework refers to software providing functionality that can be implemented with hardware embodied on a device.

In some embodiments, the end-to-end software-based system operates within the components of the data management, assessment, navigation, and/or discovery system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Some embodiments are described with respect a neural network, a type of machine-learning model that learns to approximate unknown functions by analyzing example (e.g., training) data at different levels of abstraction. Generally, neural networks model complex non-linear relationships by generating hidden vector outputs along a sequence of inputs. In some cases, a neural network includes a model of interconnected digital neurons that communicate and learn to approximate complex functions and generate outputs based on a plurality of inputs provided to the model. In various implementations, a neural network includes any of a variety of deep learning models, including convolutional neural networks, recurrent neural networks, deep neural networks, and deep stacking networks, to name a few examples. In some embodiments, a neural network includes or otherwise makes use of one or more machine learning algorithms to learn from training data. In other words, a neural network can include an algorithm that implements deep learning techniques such as machine learning to attempt to model high-level abstractions in data.

Although some implementations are described with respect to neural networks, some embodiments are implemented using other types of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
receiving input identifying a dataset for ingestion into a data lake, the dataset including a plurality of attributes;
generating, based on sample data from the dataset, a first attribute quality metric for a first attribute of the plurality of attributes of the dataset, wherein the first attribute quality metric indicates at least one of: cardinality, completeness, correctness, and objectivity; and
causing a user interface to present an interactive tree view with a hierarchy of a plurality nodes that represent a nested attribute schema of the dataset, a first node of the plurality of the nodes visually representing quality of the first attribute based on the quality metric for the the first attribute, where an interaction with the first attribute displayed in the interactive tree causes the user interface to be updated to display a visual representation of the value of the first attribute.

2. The one or more computer storage media of claim 1, the operations further comprising ingesting the sample data from the dataset into a landing zone separate from the data lake.

3. The one or more computer storage media of claim 1, the operations further comprising generating the first attribute quality metric off the sample data stored in a landing zone separate from the data lake.

4. The one or more computer storage media of claim 1, the operations further comprising generating the first attribute quality metric off a stream of the sample data being ingested into in a landing zone separate from the data lake.

5. The one or more computer storage media of claim 1, the operations further comprising, based on a second interaction with a second node of the plurality of nodes, causing the user interface to present values of multiple of the corresponding to a plurality of attribute quality metrics quantifying different measures of quality of the corresponding attribute of the plurality of attributes.

6. The one or more computer storage media of claim 1, wherein the first node of the plurality of nodes is associated with a glyph that visually represents a value of a combined attribute quality metric that quantifies health of the corresponding attribute based on a combination of a plurality of attribute quality metrics for the corresponding attribute including the first attribute quality metric.

7. The one or more computer storage media of claim 1, the operations further comprising, based on input indicating an instruction to ingest the dataset responsive to the interactive tree view, ingesting the dataset into the data lake.

8. The one or more computer storage media of claim 1, the operations further comprising accepting input configuring which of a plurality of attribute quality metrics the nodes in the interactive tree view represent.

9. A method comprising:
receiving input identifying a dataset for ingestion into a data lake, the dataset including a plurality of attributes;
generating, based on sample data from the dataset, a first attribute quality metric for an attribute of the plurality of attributes of the dataset, wherein the first attribute quality metrics indicates at least one of: cardinality, completeness, correctness, and objectivity; and
causing a user interface to present an interactive tree view with a hierarchy of a plurality of nodes that represent a nested attribute schema of the dataset, a first node of the plurality of the nodes selectable to cause presentation of a representation of a value associated with the first attribute quality metric corresponding to the first attribute represented by the node, where an interaction with the first node displayed in the interactive tree causes the user interface to be updated to display a visual representation of the value of the first attribute quality metric.

10. The method of claim 9, further comprising ingesting the sample data from the dataset into a landing zone separate from the data lake.

11. The method of claim 9, further comprising generating the first attribute quality metric off the sample data stored in a landing zone separate from the data lake.

12. The method of claim 9, further comprising generating the first attribute quality metric off a stream of the sample data being ingested into in a landing zone separate from the data lake.

13. The method of claim 9, further comprising, based on a second interaction with a second node of the plurality of the nodes, causing the user interface to present values of multiple of the attribute quality metrics quantifying different measures of quality of the corresponding attribute of which the first attribute quality metric is a member.

14. The method of claim 9, wherein the first node of the plurality of nodes is associated with a glyph that visually represents a value of a combined attribute quality metric that quantifies health of the first attribute based on a combination of multiple attribute quality metrics for the first attribute, where the first attribute quality metric is included in the combination.

15. The method of claim 9, further comprising, based on input indicating an instruction to ingest the dataset responsive to the interactive tree view, ingesting the dataset into the data lake.

16. The method of claim 9, further comprising accepting input configuring which of a set of attribute quality metrics the nodes in the interactive tree view represent, where the first attribute quality metric is a member of the set of attribute quality metrics.

17. A computer system comprising:
   one or more hardware processors and memory configured to provide computer program instructions to the one or more hardware processors; and
   a data management tool configured to use the one or more hardware processors to:
   receive input identifying a dataset, the dataset including a plurality of attributes;
   access a first attribute quality metric that quantify quality of a first attribute of the plurality of attributes of the dataset or a first attribute consumption metric that quantify tracked consumption of the first attribute of the plurality of attributes of the dataset, wherein the attribute quality metrics indicate at least one of: cardinality, completeness, correctness, and objectivity; and
   cause a user interface to present an interactive tree view with a hierarchy of a plurality of nodes that visually represent the plurality of attributes and values associated with a set of attribute quality metrics or a set of attribute consumption metrics, where the first attribute quality metric is a member of the set of attribute quality metrics or the first attribute consumption metric is member of the set of attribute consumption metrics and an interaction with the first attribute displayed in the interactive tree causes the user interface to be updated to display a visual representation of a value associated with the first attribute.

18. The computer system of claim 17, wherein the data management tool is configured to cause, based on the interaction with the first node, the user interface to present values of the first attribute quality metric quantifying different measures of quality of the first attribute and the first attribute consumption metric quantifying different measures of consumption of the first attribute.

19. The computer system of claim 17, wherein the first node of the plurality of the nodes is associated with a glyph that visually represents a value of a combined attribute health metric that quantifies health of the first attribute based on a combination of multiple of the set of attribute quality metrics or the set of attribute consumption metrics for the first attribute.

20. The computer system of claim 17, wherein the data management tool is configured to accept input configuring whether the plurality of nodes in the interactive tree view represent a subset of attribute quality metrics of the set of attribute quality metrics or a subset of attribute consumption metrics of the set of attribute consumption metrics.

\* \* \* \* \*